United States Patent
Hertzman et al.

(10) Patent No.: US 7,762,135 B2
(45) Date of Patent: Jul. 27, 2010

(54) COMPENSATED MEASUREMENT OF ANGULAR DISPLACEMENT

(75) Inventors: Mikael Hertzman, Sollentuna (SE); Thomas Klang, Åkersberga (SE)

(73) Assignee: Trimble AB, Danderyd (SE)

( * ) Notice: Subject to any disclaimer, the term of this patent is extended or adjusted under 35 U.S.C. 154(b) by 300 days.

(21) Appl. No.: 11/794,308

(22) PCT Filed: Dec. 8, 2005

(86) PCT No.: PCT/EP2005/013164

§ 371 (c)(1), (2), (4) Date: Feb. 21, 2008

(87) PCT Pub. No.: WO2006/074768

PCT Pub. Date: Jul. 20, 2006

(65) Prior Publication Data

US 2009/0024342 A1    Jan. 22, 2009

(51) Int. Cl.
*G01P 3/00* (2006.01)
(52) U.S. Cl. ........................................... 73/509
(58) Field of Classification Search ................... 73/509, 73/510
See application file for complete search history.

(56) References Cited

U.S. PATENT DOCUMENTS

| 4,136,955 A | 1/1979 | Aeschlimann et al. |
| 2002/0144422 A1 * | 10/2002 | Suhara et al. ................. 33/613 |

FOREIGN PATENT DOCUMENTS

JP    2001-271584    10/2001

OTHER PUBLICATIONS

International Preliminary Report on Patentability dated Jul. 17, 2007 for corresponding International Application No. PCT/EP2005/013164.

* cited by examiner

*Primary Examiner*—Hezron Williams
*Assistant Examiner*—Tamiko D Bellamy
(74) *Attorney, Agent, or Firm*—Harness, Dickey & Pierce, P.L.C.

(57) ABSTRACT

There is disclosed methods and apparatus for compensated measurement of angular displacement within an instrument (600), such as a total station. Improved and compensated measurement of angular displacement is obtained by using a combination of e.g. an angular resolver (145) and an inertial sensor (645). A compensated angular position measurement is produced by combining at least portions of the output signals obtained from the angular resolver and the inertial sensor, respectively.

26 Claims, 20 Drawing Sheets

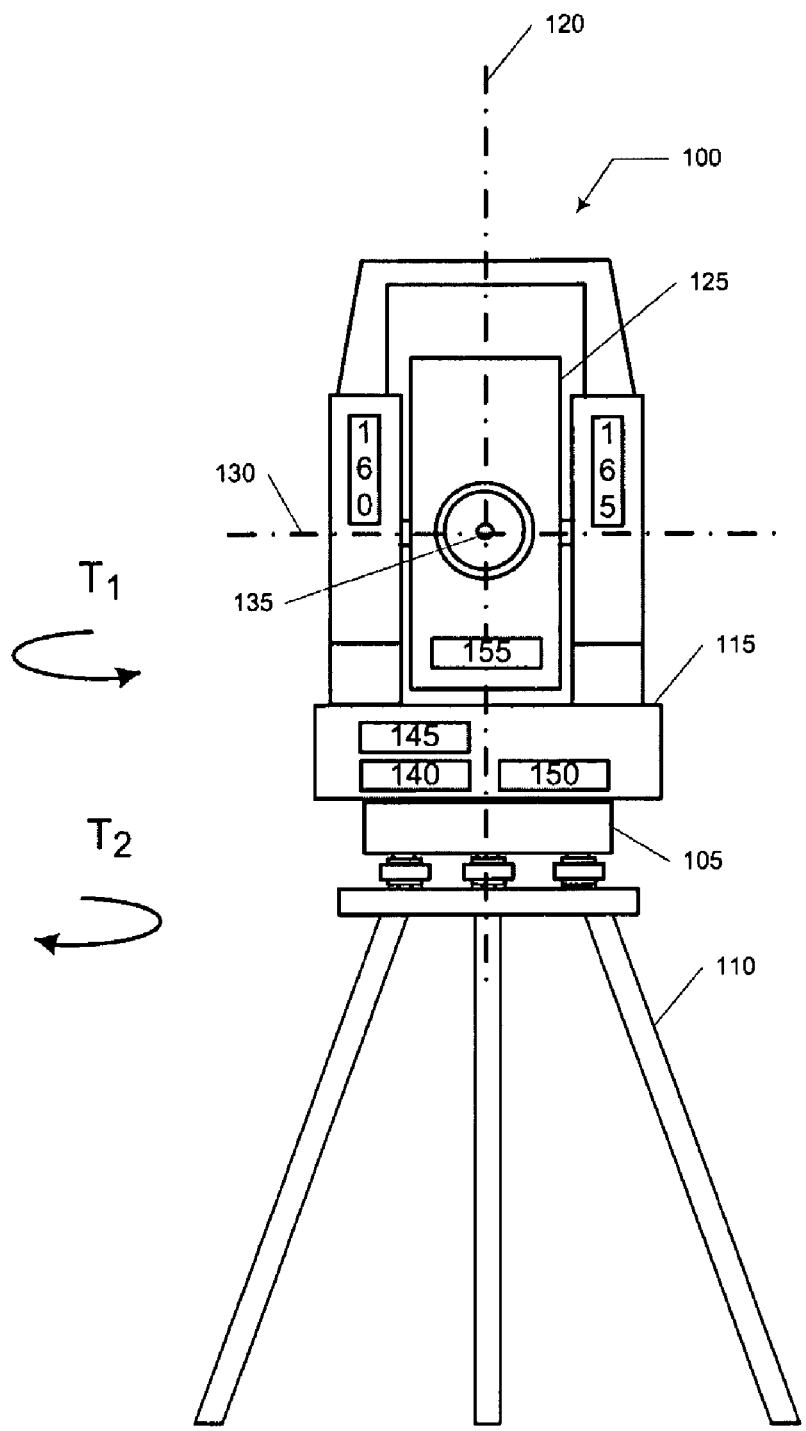
Prior Art
Fig. 1

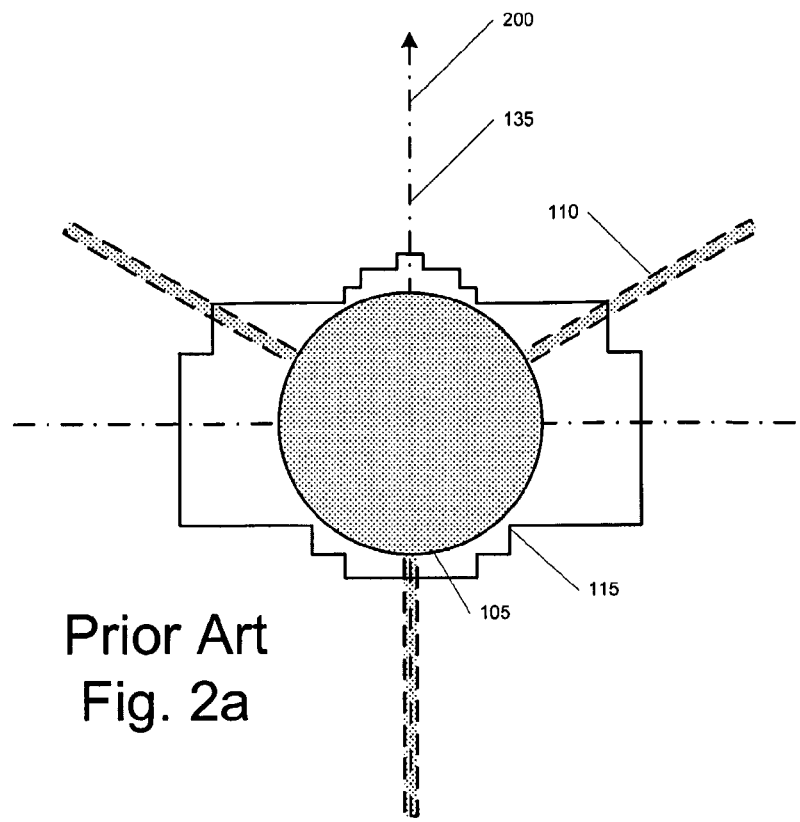
Prior Art
Fig. 2a
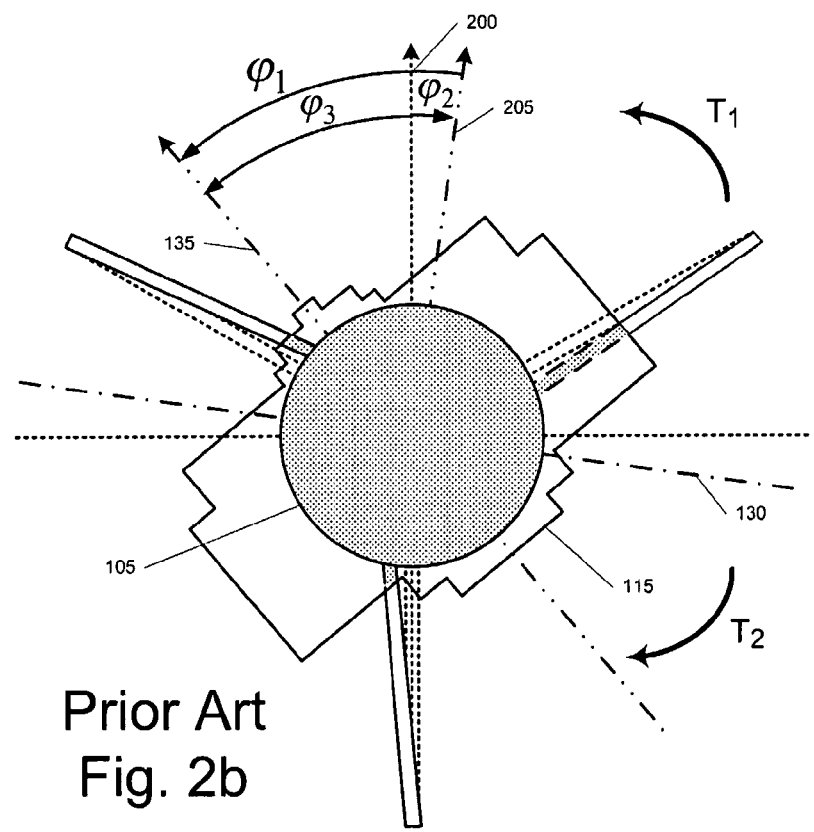
Prior Art
Fig. 2b

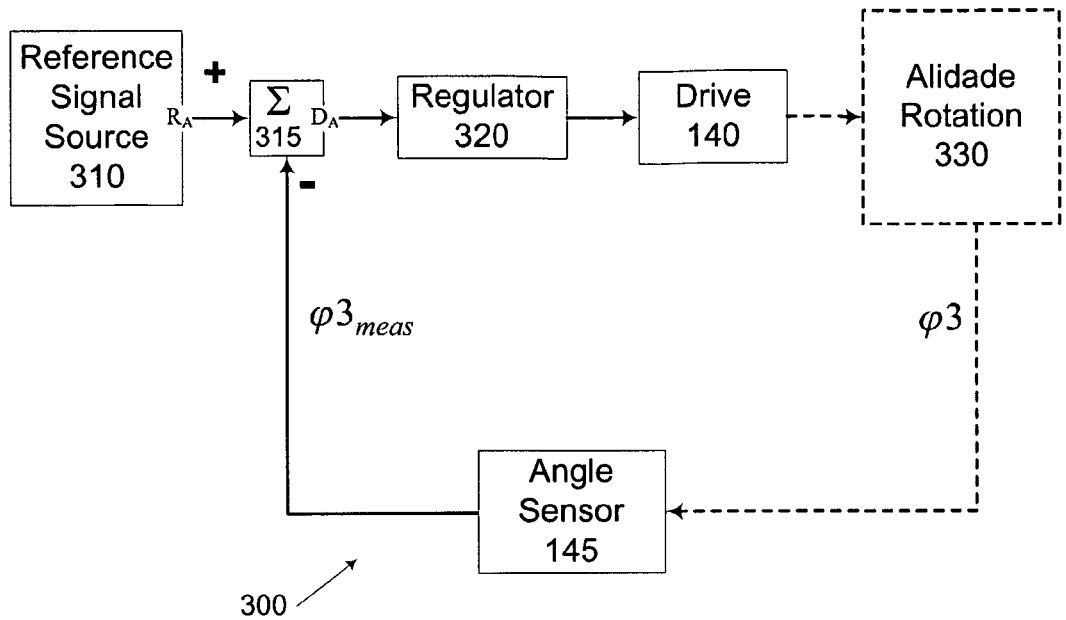
Prior Art
Fig. 3a
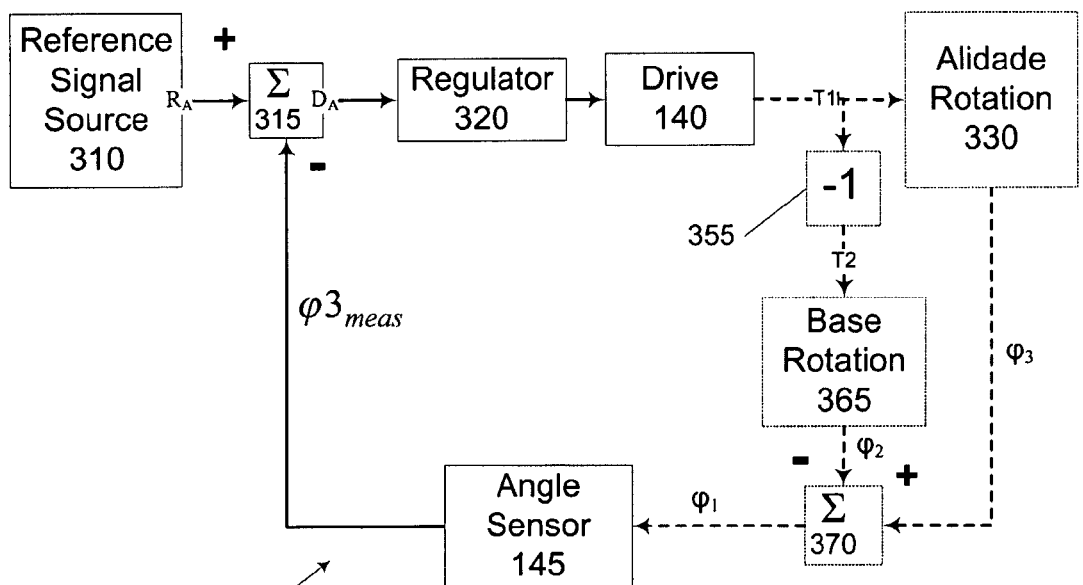
Prior Art
Fig. 3b

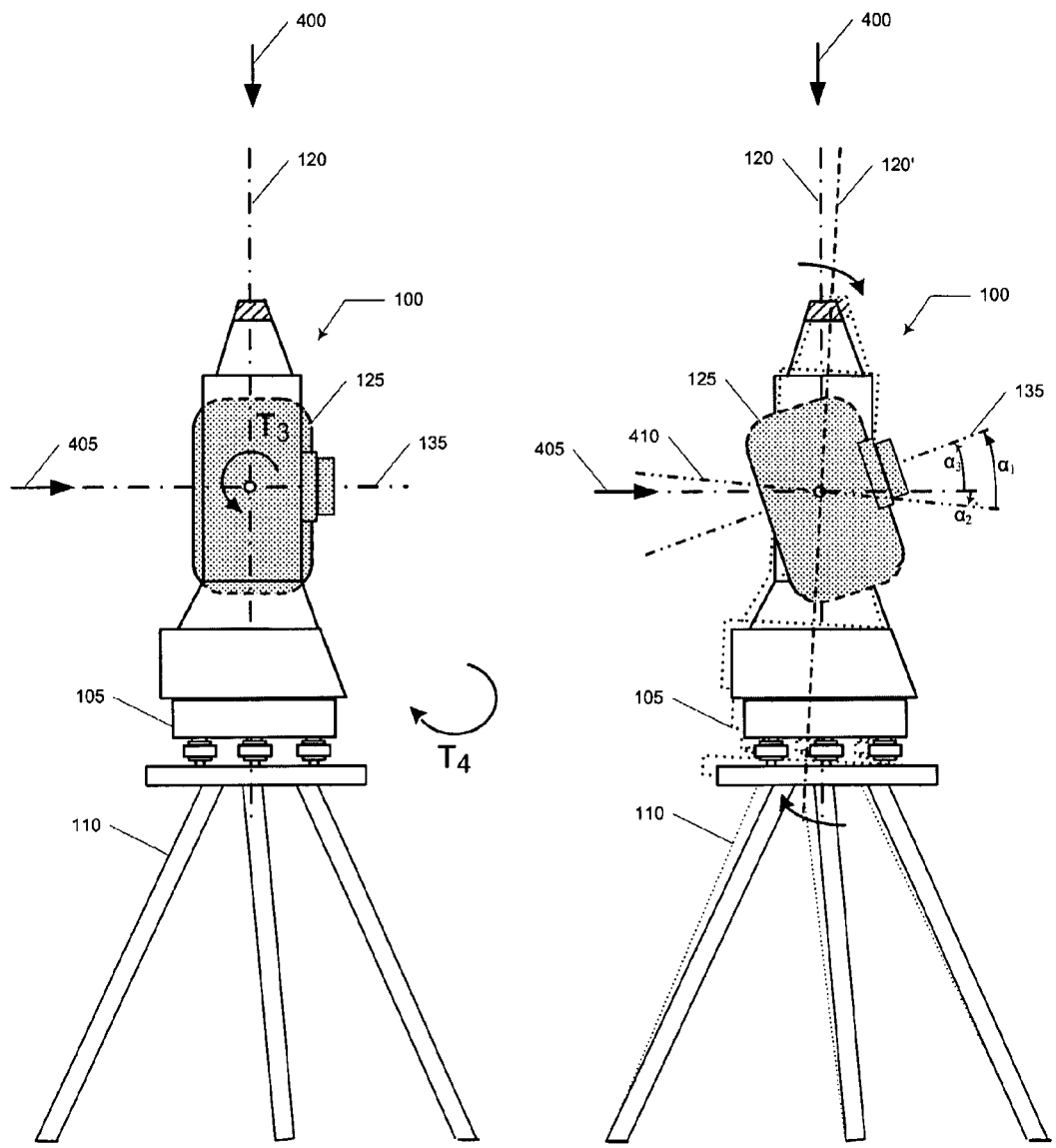
Prior Art
Fig. 4a
Prior Art
Fig. 4b

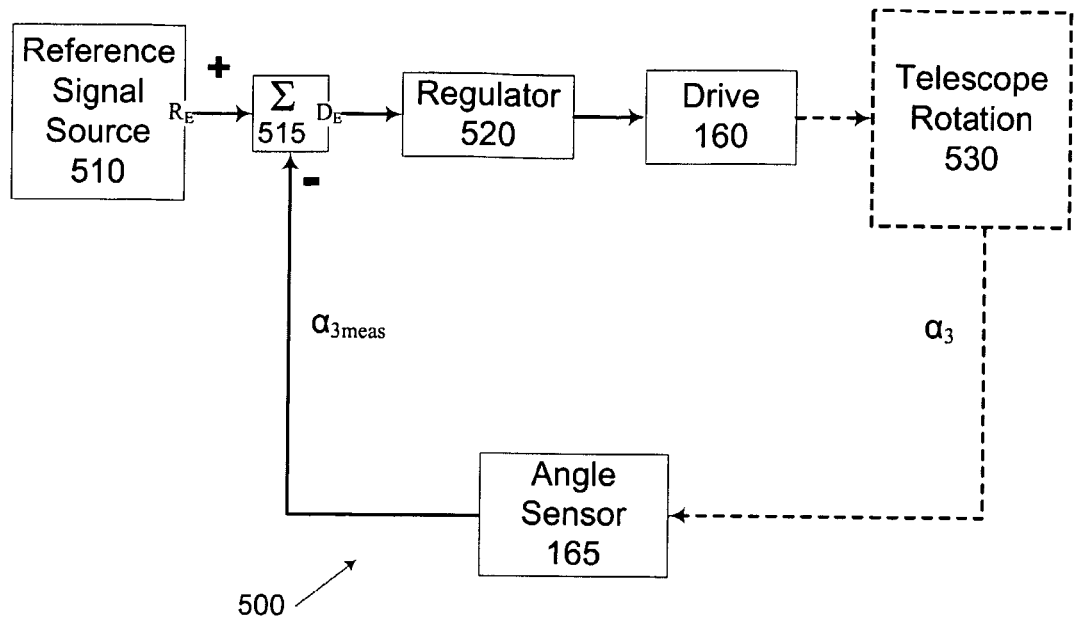
Prior Art
Fig. 5a
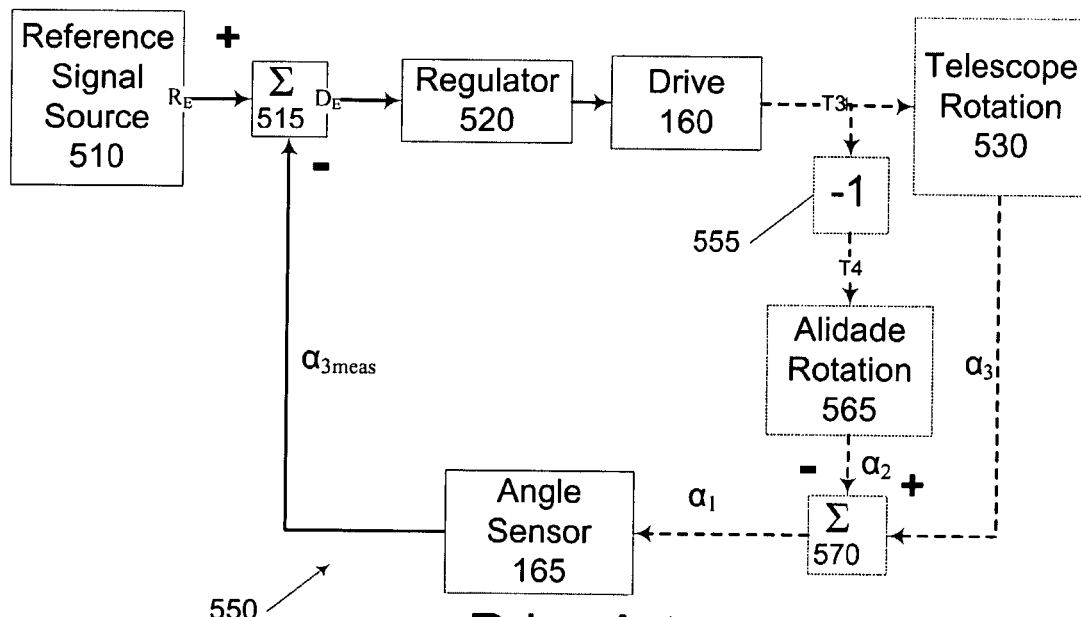
Prior Art
Fig. 5b

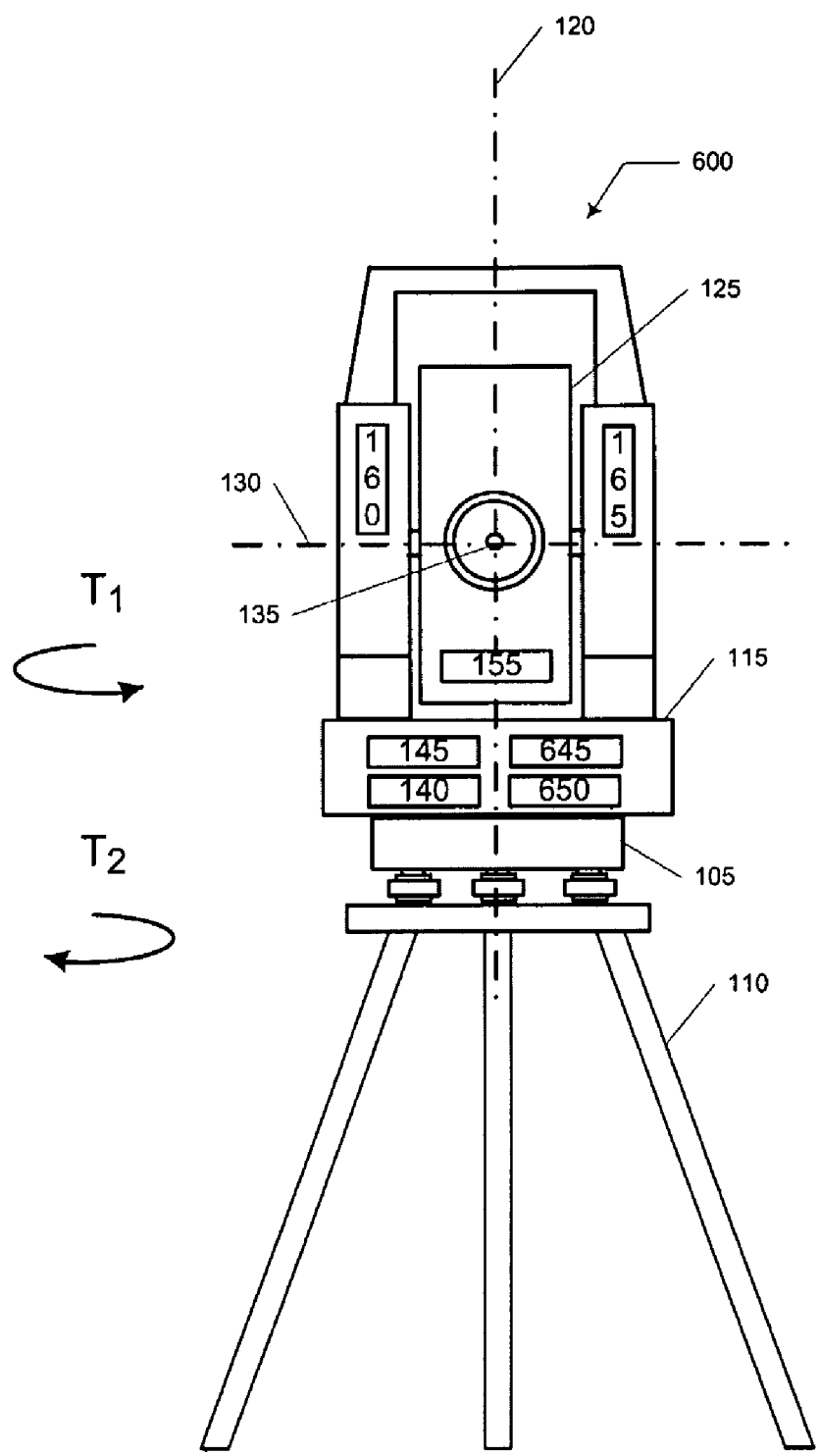
Fig. 6

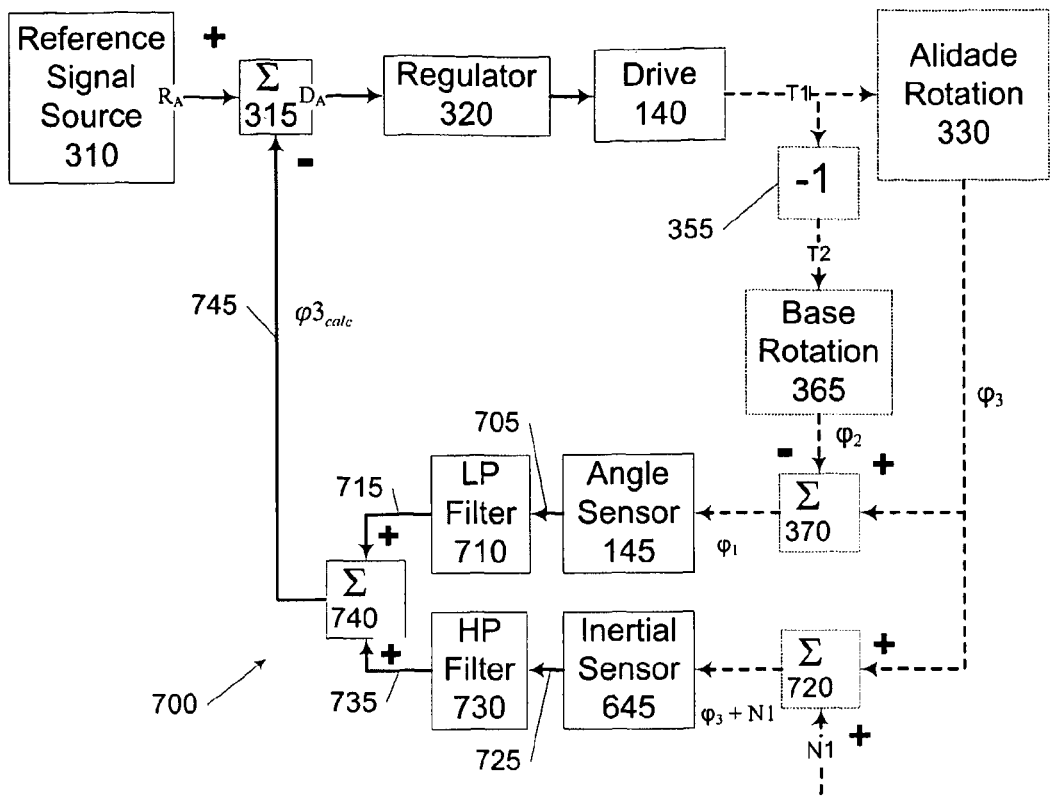
Fig. 7
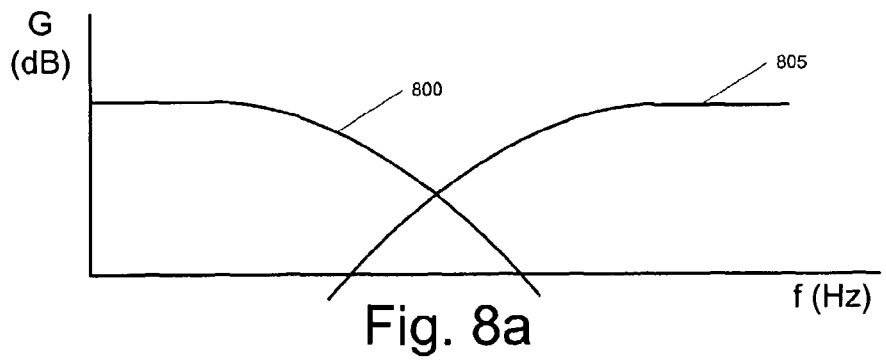
Fig. 8a
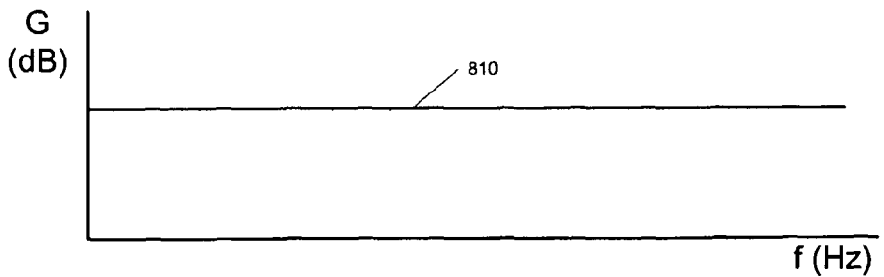
Fig. 8b

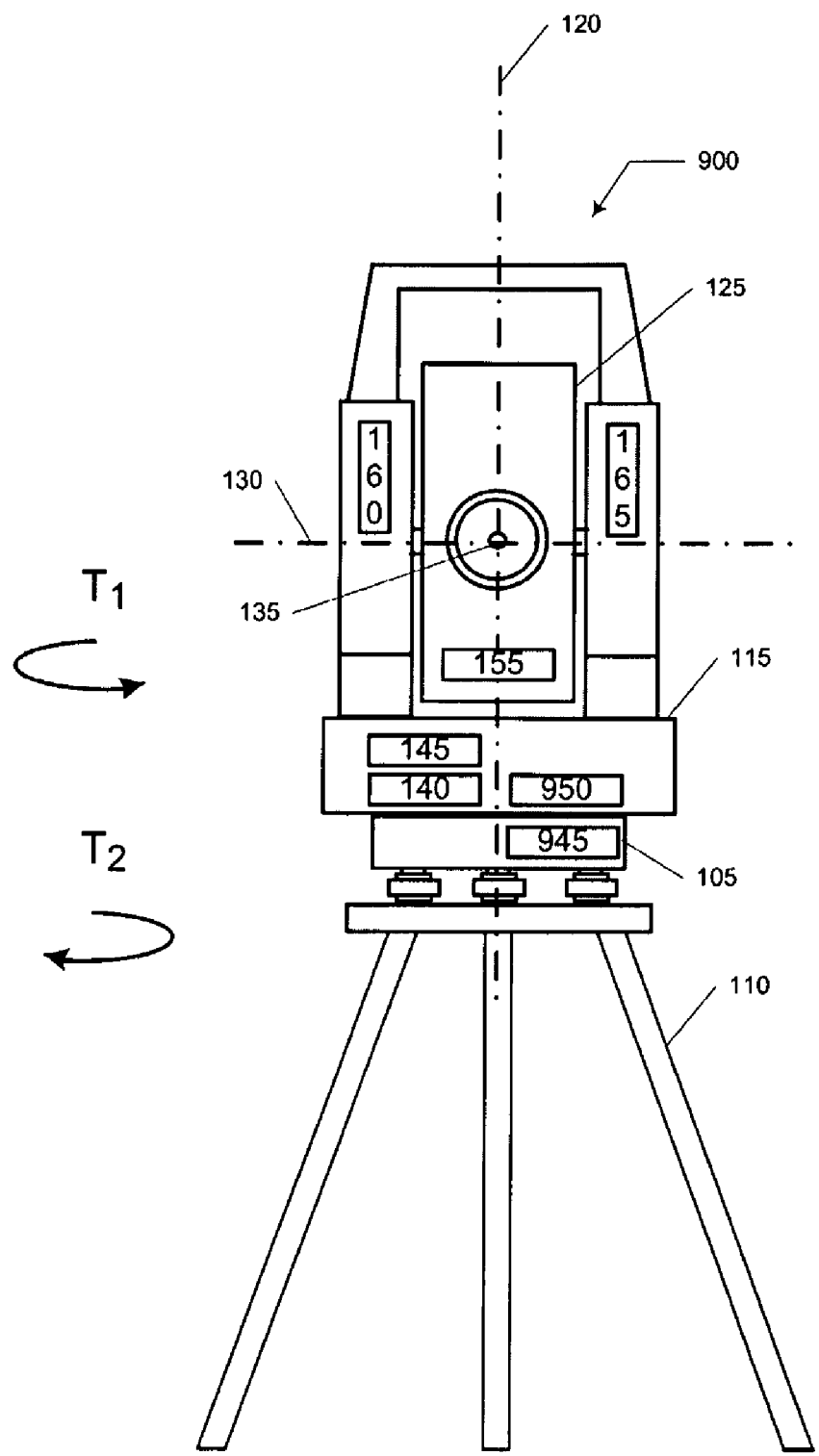
Fig. 9

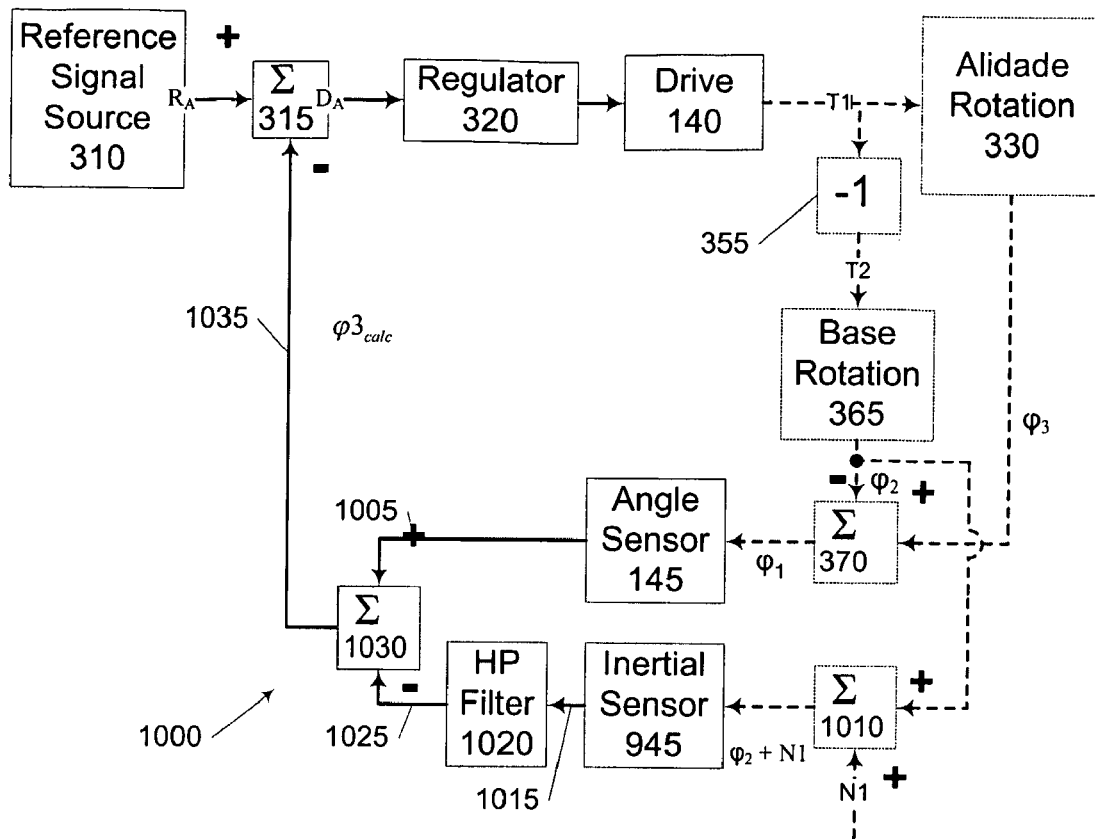
Fig. 10
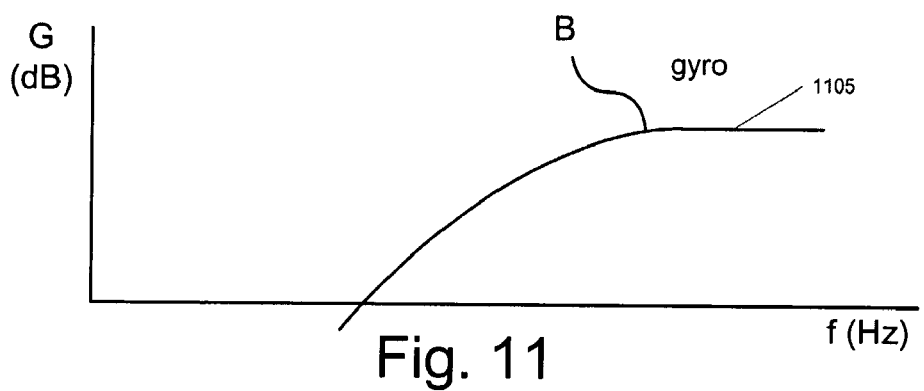
Fig. 11

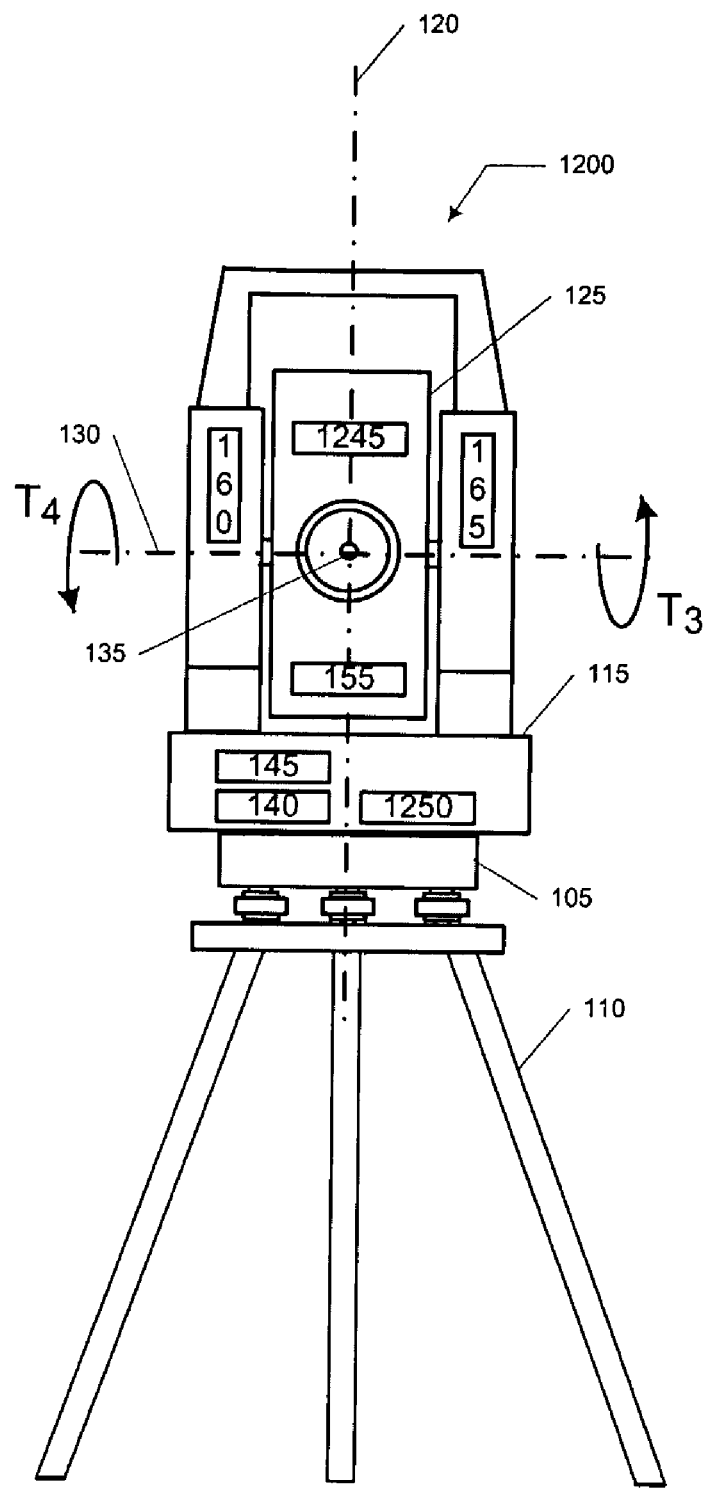
Fig. 12

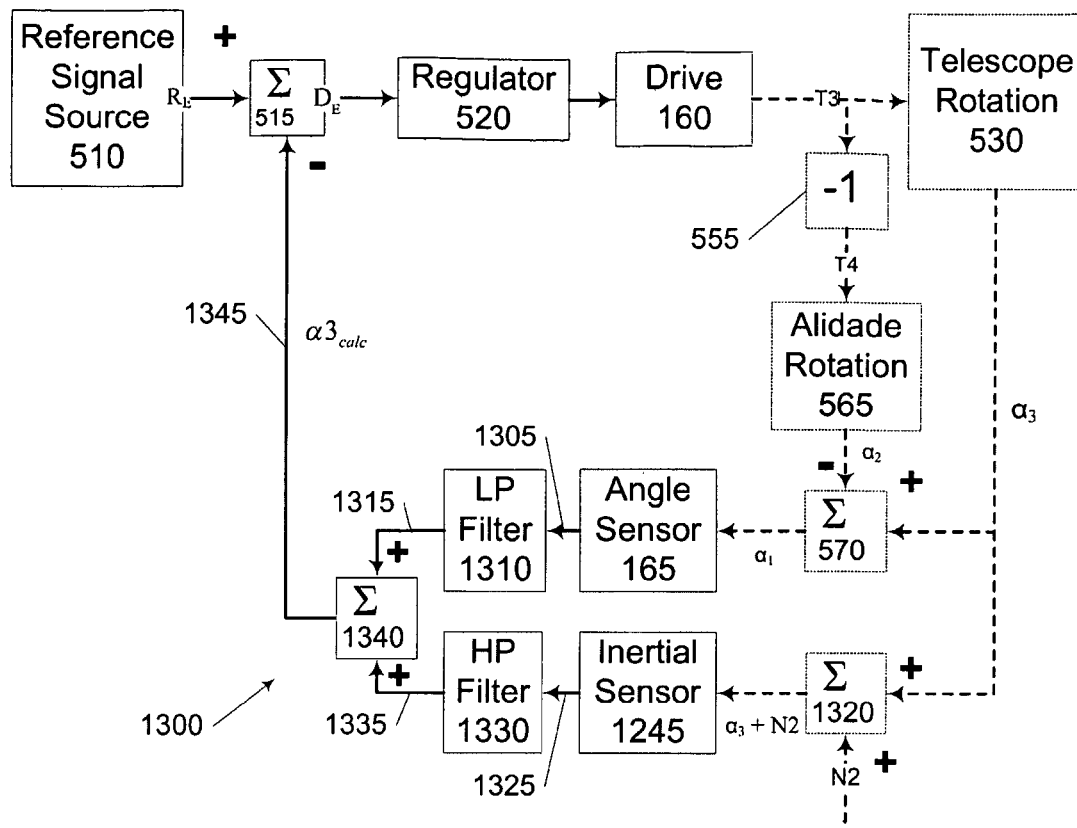
Fig. 13
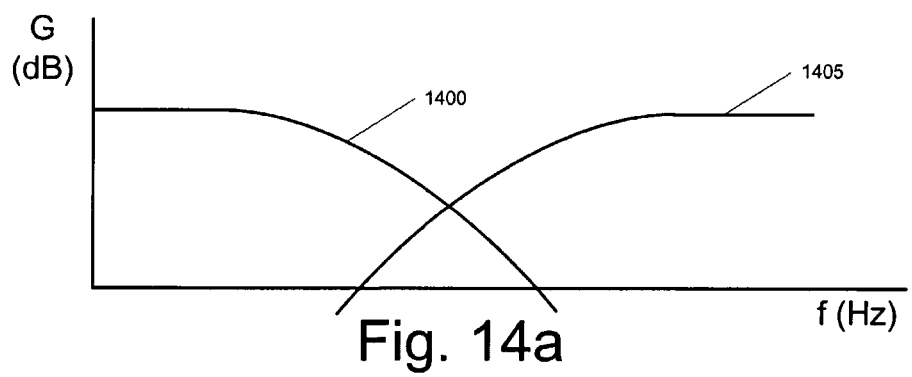
Fig. 14a
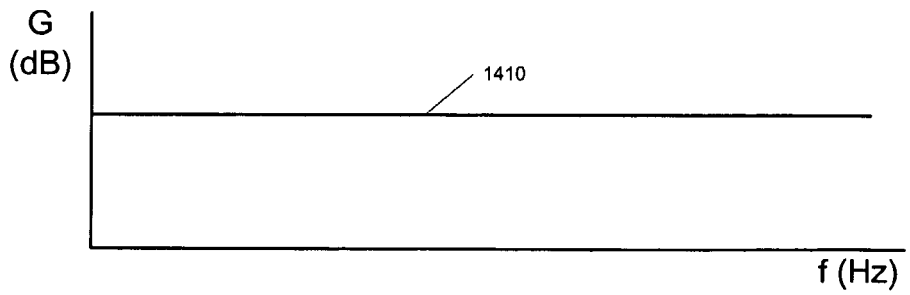
Fig. 14b

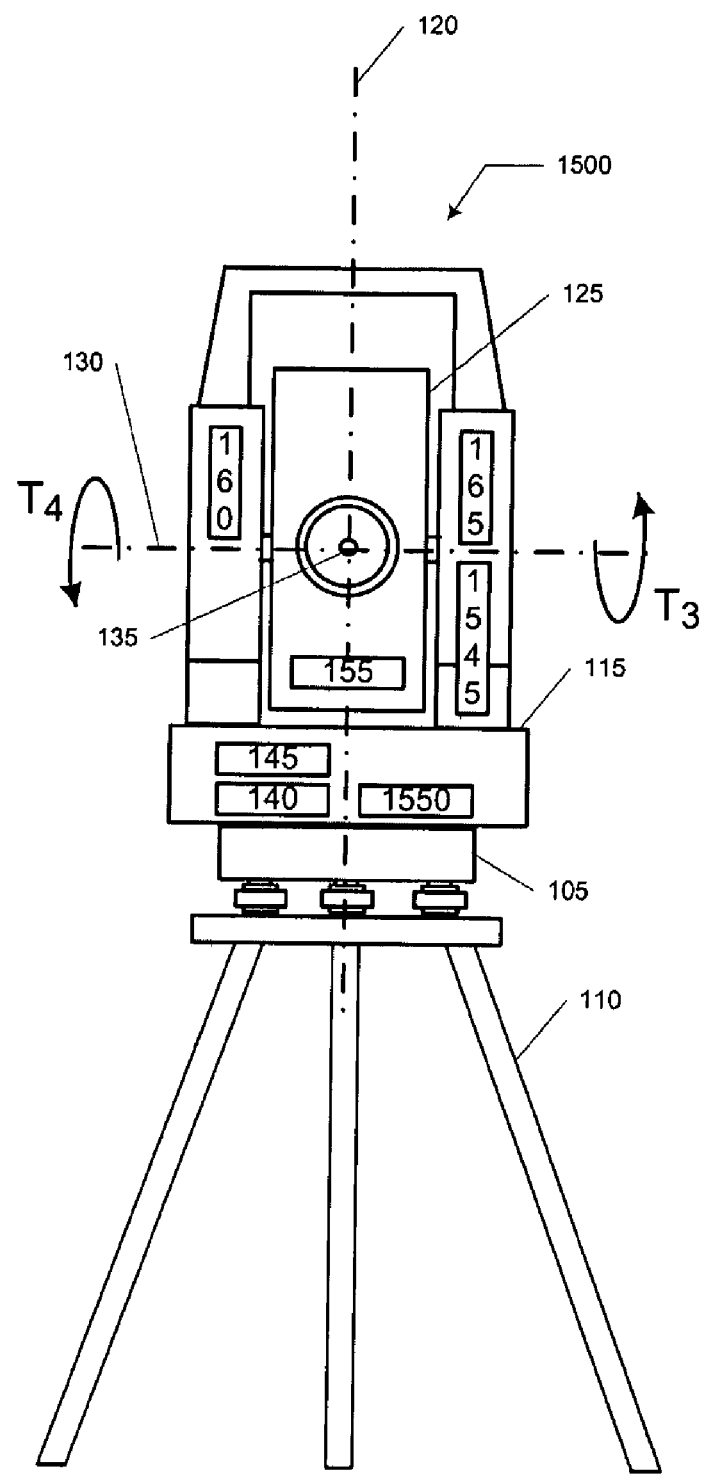
Fig. 15

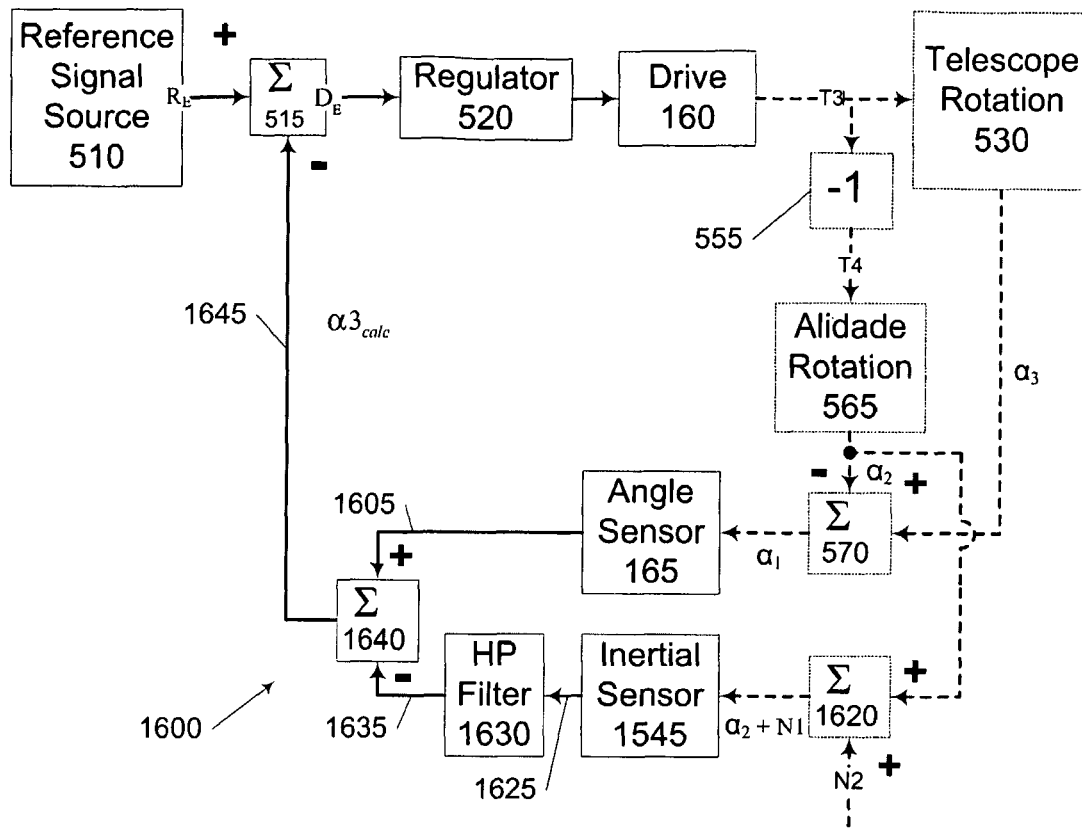
Fig. 16
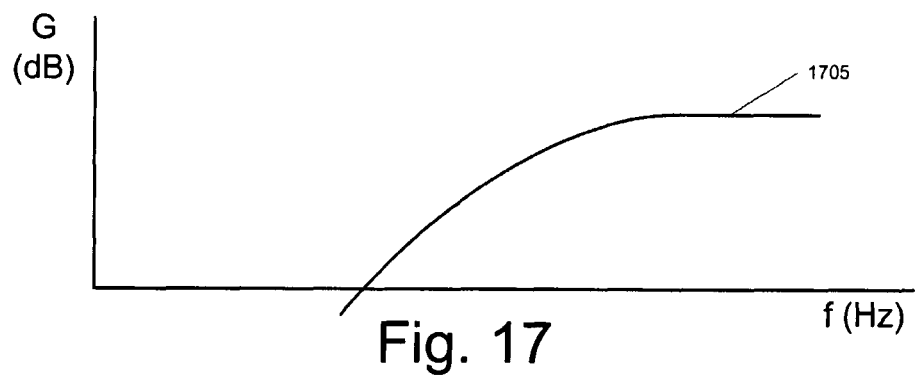
Fig. 17

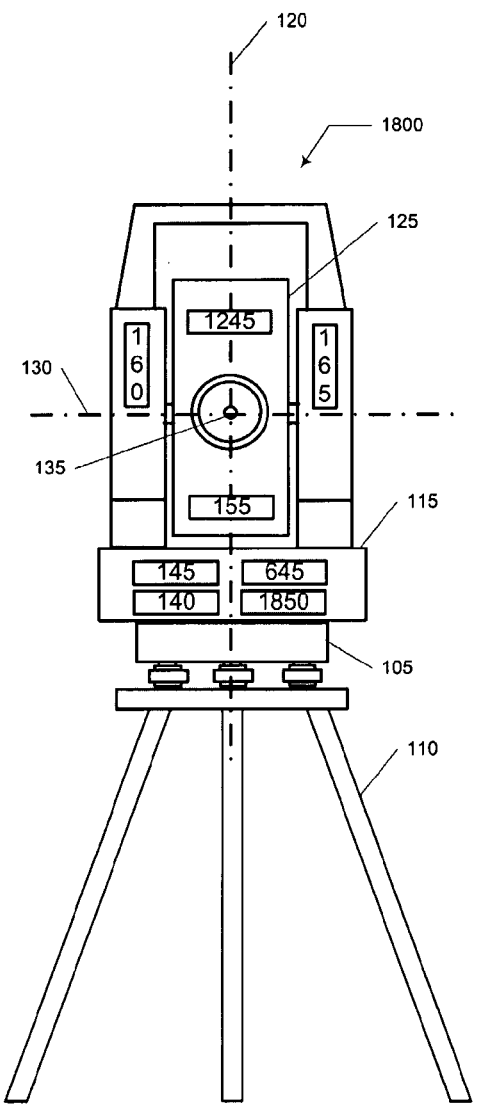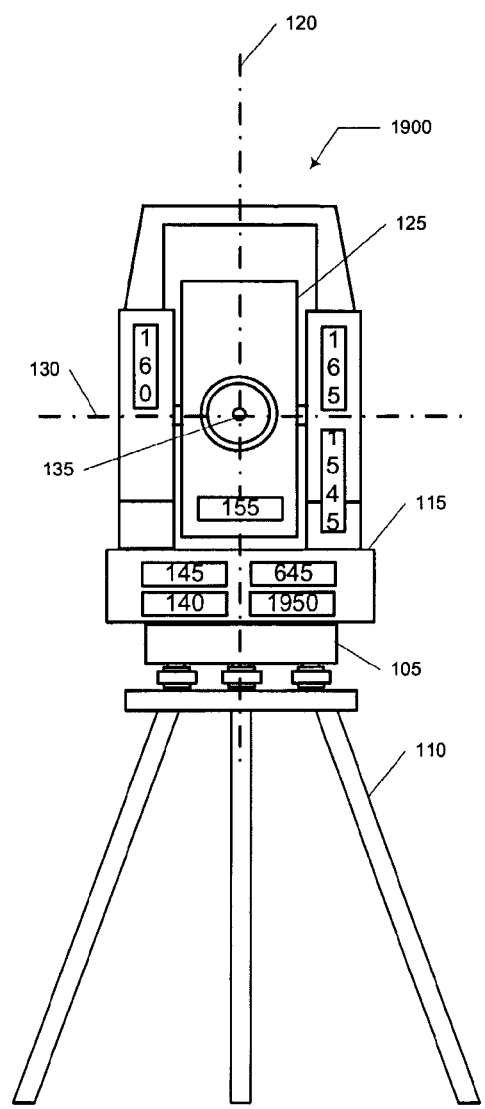
Fig. 18          Fig. 19

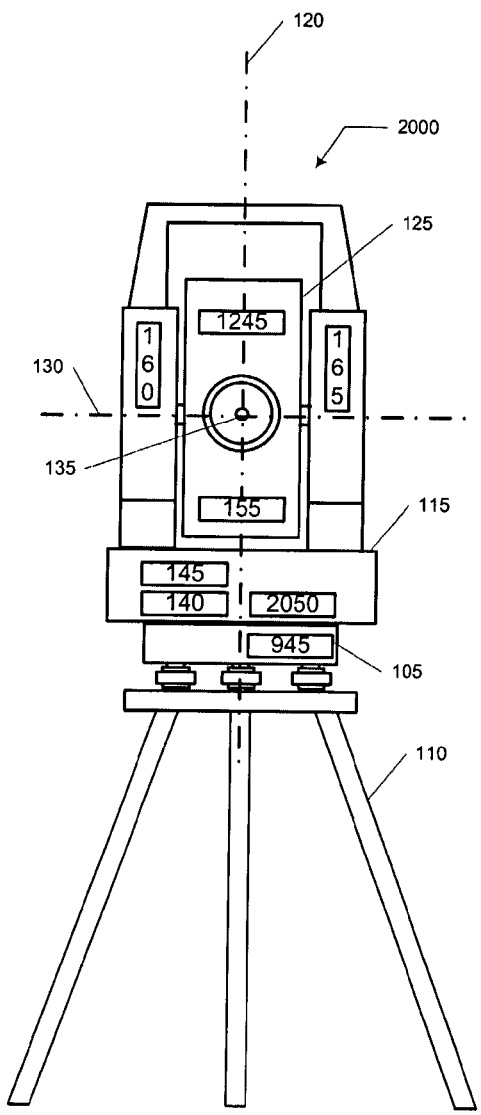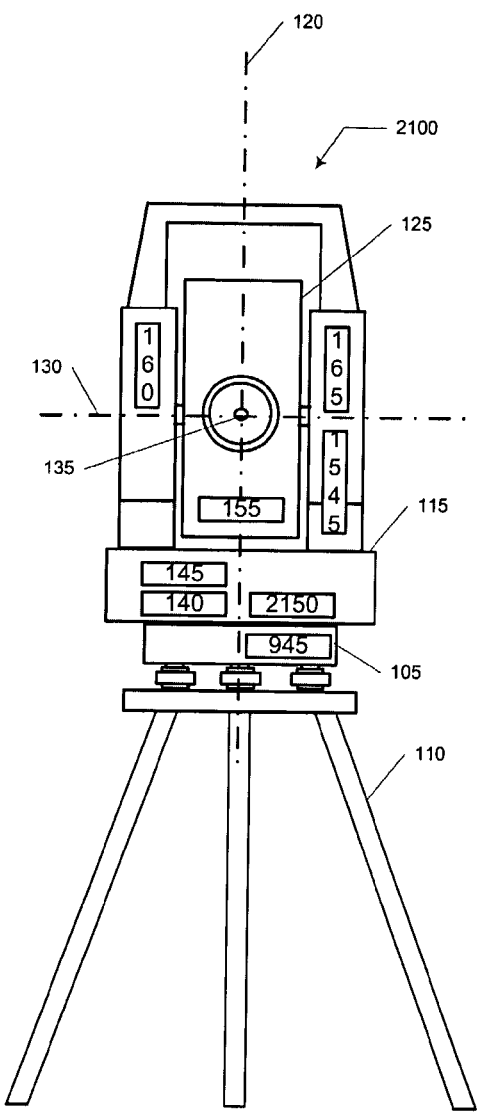
Fig. 20   Fig. 21

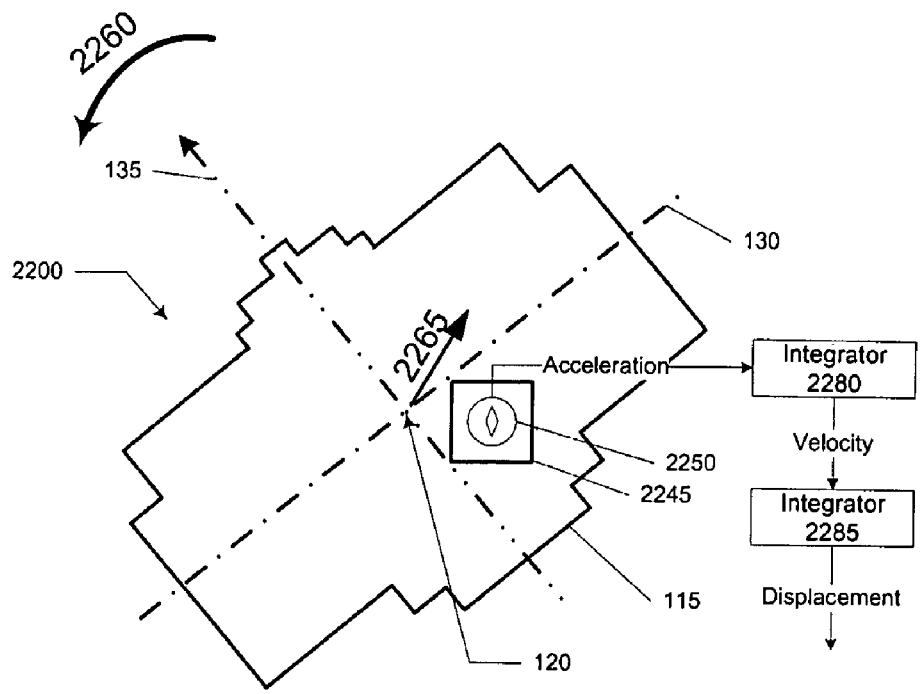
Fig. 22
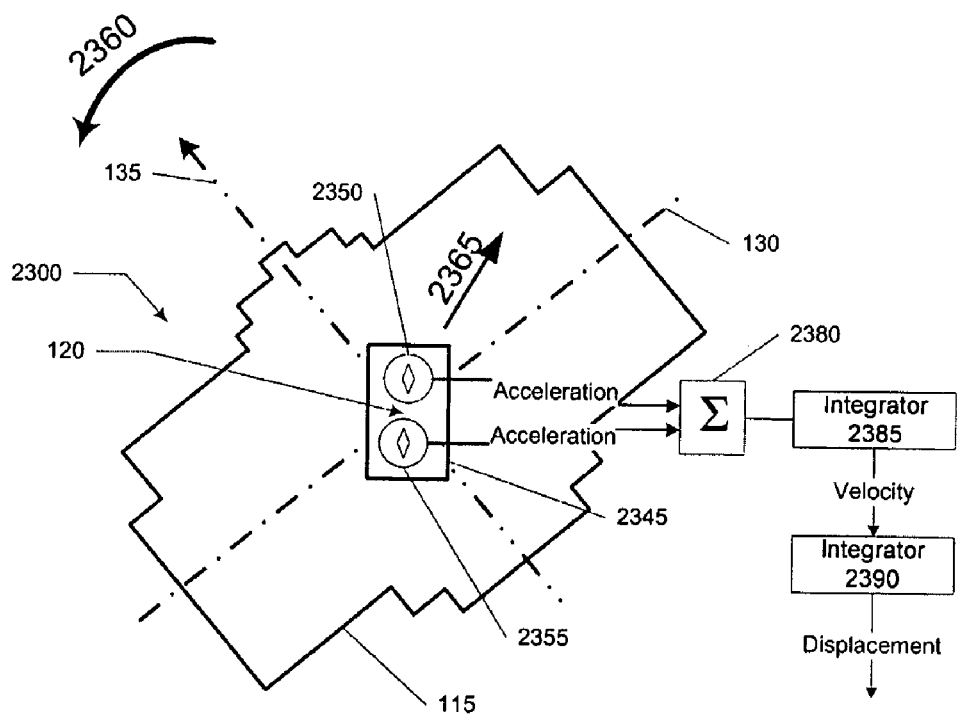
Fig. 23

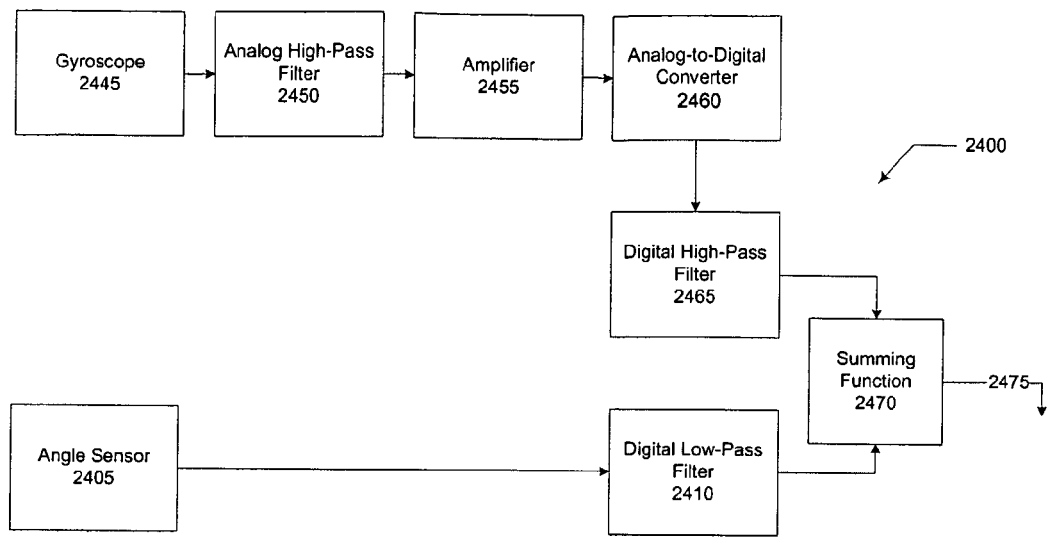
Fig. 24
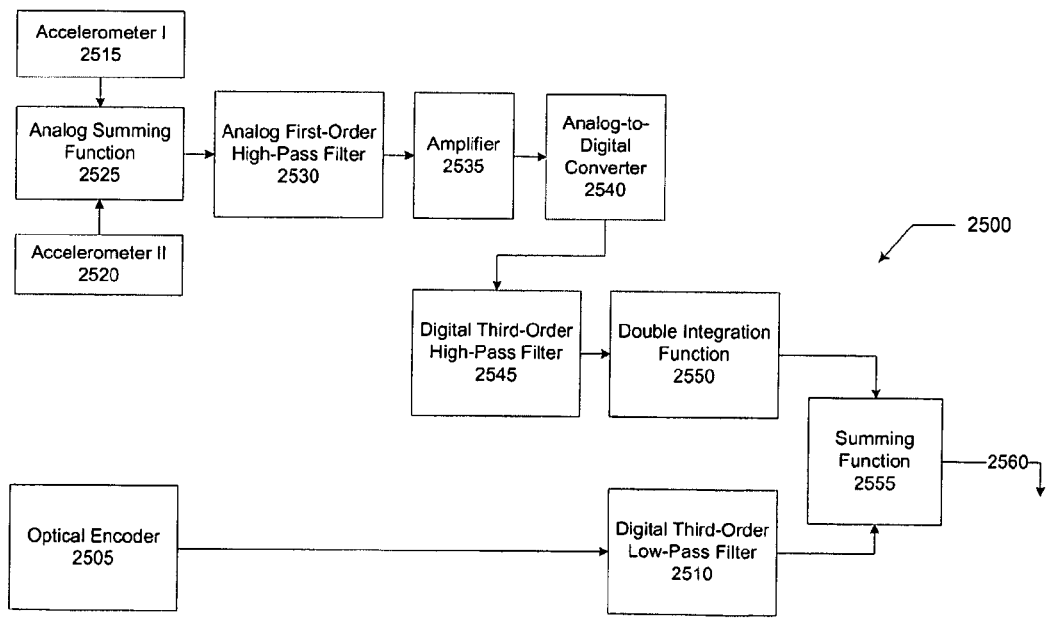
Fig. 25

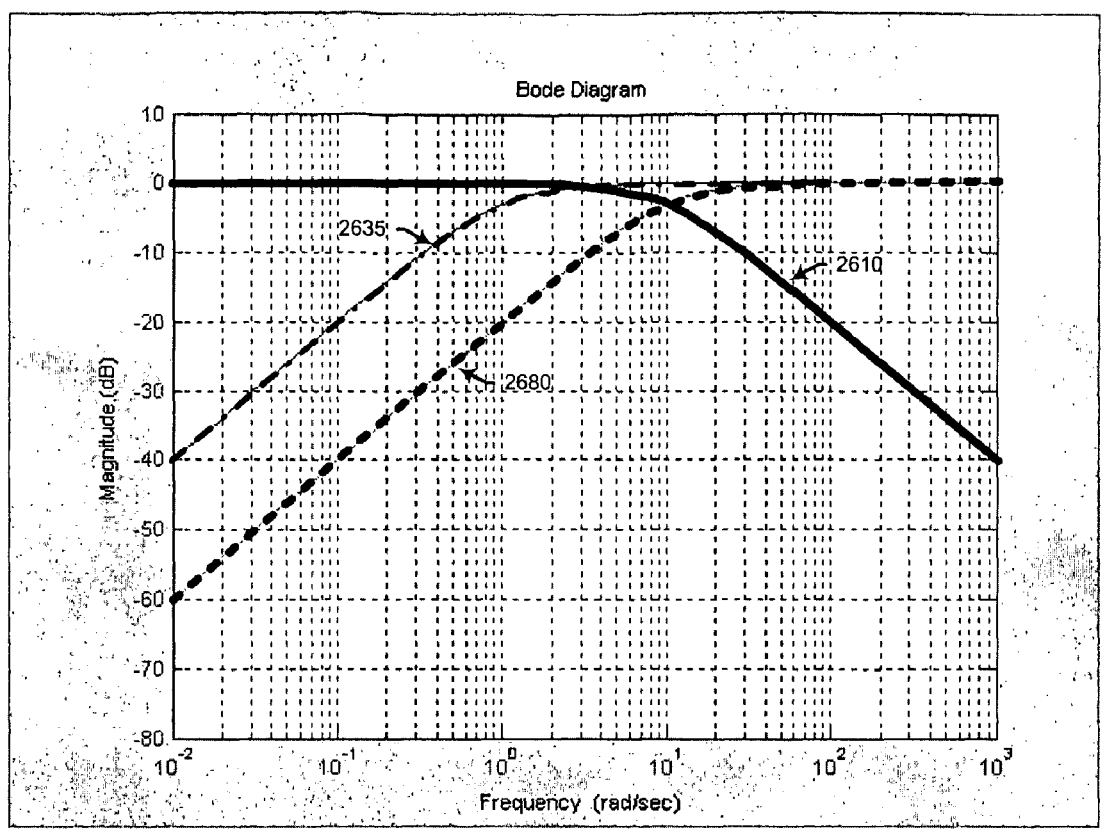
Fig. 26

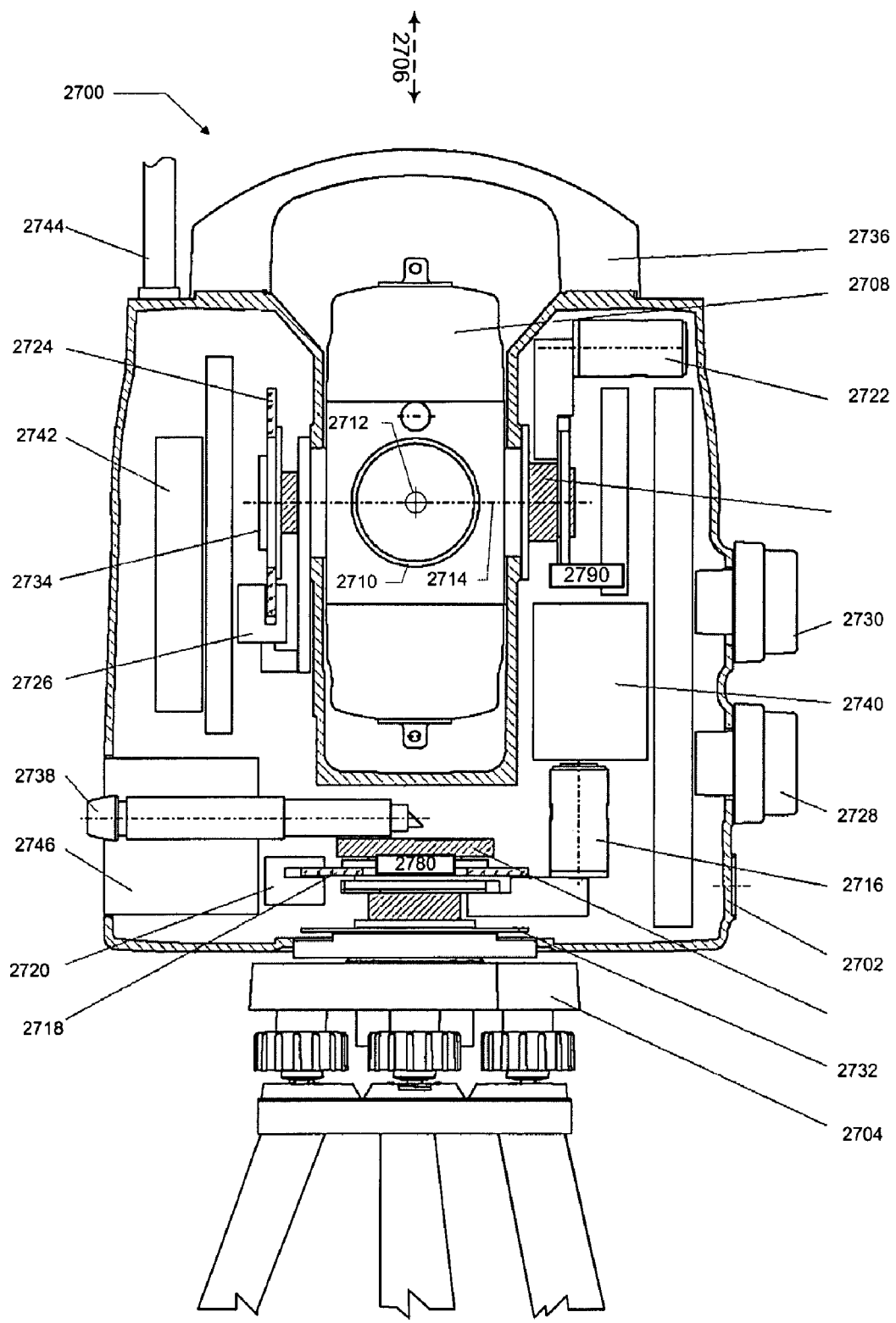
Fig. 27

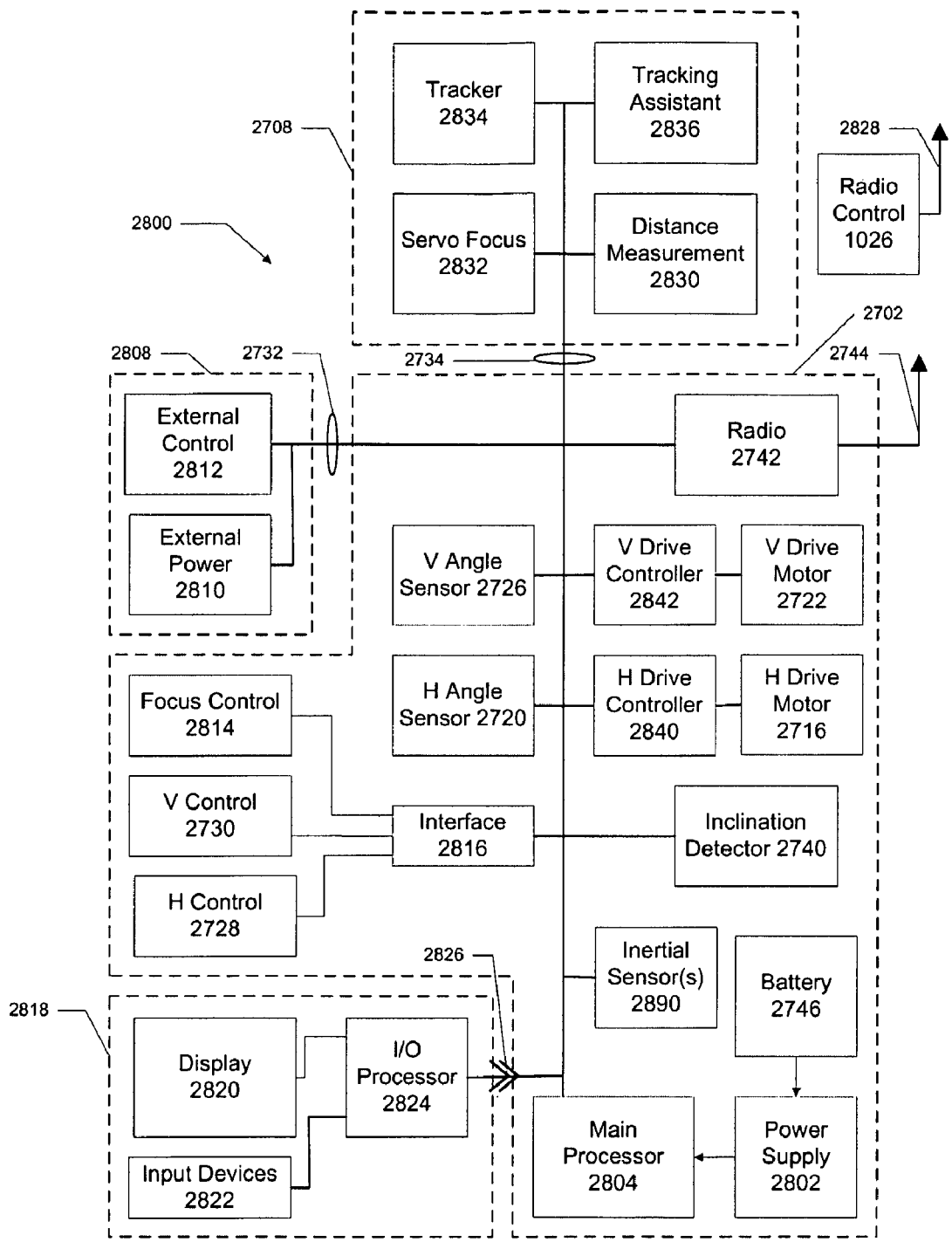
Fig. 28

COMPENSATED MEASUREMENT OF ANGULAR DISPLACEMENT

DOMESTIC PRIORITY INFORMATION

This is application is National Phase entry of International Application number PCT/EP2005/013164 filed on Dec. 8, 2005, and claims priority under 35 U.S.C. §119 to U.S. Provisional Application No. 60/643,521, filed on Jan. 12, 2005, the entire contents of which is hereby incorporated.

TECHNICAL FIELD

The inventive ideas presented herein relates to methods and apparatus for detecting angular displacement, particularly for detecting angular displacement of one or more components of a geodetic instrument, such as a total station.

BACKGROUND

Total stations are instruments used in electronic surveying of natural surroundings and structures, particularly for determining distance and angle between the total station and a point of measurement.

In order to aim the telescope of the total station towards a target point of measurement, drive controls are provided for controlling the azimuthal and elevational orientation of the telescope. The total station typically includes an alidade which is rotationally mounted on a base structure, such as a tripod or the like, for rotation about a vertical axis. In addition, the total station comprises a support structure for elevational rotation of the telescope about a horizontal axis.

To track the current azimuthal and elevational orientation of the telescope in the total station, there is provided means for acquiring angular measurement signals in the azimuthal and elevational directions.

The azimuthal angular measurement signal is used to control the drive so as to rotate the alidade to any desired azimuthal orientation as represented by a reference signal.

FIG. 1 shows a simplified elevation view of a total station 100 having a base 105 mounted on a tripod 110, an alidade 115 mounted on the base for rotation about an azimuthal axis 120 and a telescope 125 mounted on the alidade for rotation about an elevation axis 130. The telescope 125 has a sighting axis 135. A controllable drive 140 rotates alidade 115 about axis 120 in response to an azimuth control signal. An angle sensor 145, such as an angle encoder or magnetic or capacitive angle resolver, produces an azimuth measurement signal representing angular position of the alidade relative to the base. Signal processing circuitry including a processor 150 is responsive to the azimuth measurement signal and an azimuthal reference representing a desired azimuthal orientation of alidade 115 for producing the azimuth control signal. The azimuthal reference is provided, for example, by input from an operator using a keypad or knob, or by a tracking subsystem 155 within the total station 100.

A controllable drive 160 rotates telescope 125 about elevation axis 130 in response to an elevation control signal. An angle sensor 165, such as an angle encoder or magnetic or capacitive angle resolver, produces an elevation measurement signal representing elevational angular position of the telescope relative to the alidade. Signal processing circuitry including processor 150 is responsive to the elevation measurement signal and an elevation reference representing a desired elevational orientation of telescope 125 to produce the elevation control signal. The elevation reference is provided, for example, by input from an operator using a keypad or knob, or by a tracking subsystem 155 within total station 100.

In operation, the base 105 is installed on the tripod 110 at a desired angular orientation relative to an azimuthal reference 200 external to the instrument, such as magnetic north, and with azimuthal rotation axis 120 plumb. As the drive 140 rotates the alidade 115, the azimuth measurement signal indicates instantaneous angular orientation of the alidade relative to base 105. At low angular acceleration of the alidade 115, the azimuth measurement signal can also be considered to represent the actual orientation of the alidade 115 relative to the external azimuthal reference 200. In contrast, high angular acceleration of the alidade 115 causes a torsional reaction of the tripod 110 and corresponding angular rotation of the base 105. The torque $T_1$ of the alidade 115 and the opposing torque $T_2$ imposed on the base 105 and on the tripod 110 are shown in FIG. 1. As the angle sensor 145 detects angular position of the alidade 115 relative to the base 105, the azimuth measurement signal does not accurately represent angular orientation of the alidade relative to the external reference 200 when the alidade is subjected to high angular acceleration. Similar torsional reaction skews the elevational angular measurement during high angular acceleration about the elevation axis 130.

Hence, there is a need for instruments and methods which account for such torsional reaction in measuring angular rotation of components subjected to high angular acceleration, particularly for geodetic instruments (such as total stations) incorporating such improvement.

SUMMARY OF THE INVENTION

One object of the present invention is to provide an instrument and a method of controlling an instrument, that account for torsional reaction in measuring angular rotation during high angular acceleration.

In order to fully understand the principles behind the present invention, a more detailed analysis of high angular accelerations in this context and the effects thereof will be given by way of introduction.

FIG. 2a shows a schematic top view of a total station 100. Shown in the figure are the base 105, mounted on the tripod 110, and the alidade 115 mounted on the base 105. The alidade 115 is mounted for rotation about a vertical axis. By rotating the alidade 115, the sighting axis 135 of the telescope 125 may be set to any desired azimuthal angle. In FIG. 2a, the telescope is rotated with its sighting axis 135 parallel to the external reference 200.

FIG. 2b shows a schematic top view of total station 100 schematically illustrating the error introduced as the alidade 115 is accelerated in a counter-clockwise direction (with reference to the figure). The angle sensor 145 produces an angle-measurement signal $\phi_{3meas}$ representing the angle $\phi_1$ between the alidade 115 (e.g., represented by sighting axis 135) and a reference 205 on the base 105. Torsional reaction to counter-clockwise acceleration of the alidade 115 causes the base 105 to rotate in a clockwise direction by some amount represented by an error angle $\phi_2$ between external reference 200 and reference 205 on the base. When this occurs, angle $\phi_1$ as measured by the angle sensor 145 is the sum of error angle $\phi_2$ and the desired angle measurement $\phi_3$ between the alidade 115 and the external reference 200.

FIG. 3a schematically illustrates an idealized control loop 300 for azimuthal rotation of alidade 115 at low angular acceleration ($\phi_2 \approx 0$). The angle sensor 145 detects the instantaneous angle $\phi_3$ between the alidade 115 and the reference

205. The resulting azimuth measurement signal $\phi_{3meas}$ is combined as shown schematically at 315 with an azimuth reference signal $R_A$ from a source 310. The resulting difference signal $D_A$ is supplied to a regulator 320 which controls the drive 140. The drive 140 rotates the alidade 115 as indicated at 330 until the difference signal $D_A$ is zero.

FIG. 3b schematically illustrates a more realistic control loop 350 which takes into account the error ($\phi_2 > 0$) introduced during acceleration of the alidade 115. The drive 140 applies a torque $T_1$ to accelerate the alidade 115. An equal and opposite reaction torque $T_2$ acts on the base 105 as the alidade 115 is accelerated, causing the base 105 to rotate in the opposite direction by an angle $\phi_2$ as indicated at 365. The angle sensor 145 measures a total angle $\phi_1$ which is the sum of angles $\phi_2$ and $\phi_3$, as represented at 370, and supplies an azimuth measurement signal $\phi_{3meas}$. The azimuth measurement signal $\phi_{3meas}$ thus includes an error in the amount of angle $\phi_2$, while the angle which should be measured is $\phi_3$ without the influence of error angle $\phi_2$.

FIG. 4a shows a schematic side view of total station 100 with the alidade 115 partially cut away to show the orientation of telescope 125 about elevation axis 130. In operation, the base 105 and the alidade 115 are installed on the tripod 110 at a desired angular orientation relative to an elevation reference 400 external to the instrument, such as a vertical (plumb) reference. Also shown in FIG. 4a is a horizontal reference 405, orthogonal to vertical reference 400. As the drive 160 rotates the telescope 125, an elevation measurement signal from the angle sensor 165 indicates instantaneous angular orientation of the telescope 125 relative to the alidade 115. At low angular acceleration of telescope 125, the elevation measurement signal can also be considered to represent the actual orientation of the telescope 125 relative to the external elevation reference 400 and thus with respect to the horizontal reference 405. In contrast, high angular acceleration of the telescope 125 causes a torsional reaction of the tripod 110 and corresponding angular rotation of the base 105. The torque $T_3$ of the telescope 125 and opposing torque $T_4$ imposed on the alidade 115, the base 105 and the tripod 110 are shown in FIG. 4a. As the angle sensor 165 detects angular position of the telescope 125 relative to the alidade 115, the elevation measurement signal does not accurately represent angular orientation of the telescope relative to the external reference 400 when the telescope 125 is subjected to high angular acceleration.

FIG. 4b shows a partially-cutaway view of the total station 100 illustrating schematically the error introduced as the telescope 125 is accelerated in a counterclockwise direction (with reference to the figure). The angle sensor 165 produces an angular measurement signal representing the angle $\alpha_1$ between the telescope 125 (e.g., represented by sighting axis 135) and a reference 410 on the alidade 115. Torsional reaction to acceleration of the telescope 125 causes the base 105 to rotate in a clockwise direction by some amount represented by an error angle $\alpha_2$ between the external reference 405 and the alidade reference 410. When this occurs, angle $\alpha_1$ is the sum of error angle $\alpha_2$ and the desired angle measurement $\alpha_3$ between the telescope 125 and the external reference 400.

FIG. 5a schematically illustrates an idealized control loop 500 for elevational rotation of the telescope 125 at low angular acceleration ($\alpha_2 \approx 0$). The angle sensor 165 detects the instantaneous angle $\alpha_3$ between the telescope 125 and the reference 405. The resulting elevation measurement signal $\alpha_{3meas}$ is combined as shown schematically at 515 with an azimuth reference signal $R_E$ from a source 510. The resulting difference signal $D_E$ is supplied to a regulator 520 which controls the drive 160. The drive 160 rotates the telescope 115 as indicated at 530 until the difference signal $D_E$ is zero.

FIG. 5b schematically illustrates a more realistic control loop 550 which takes into account the error ($\alpha_2 > 0$) introduced during acceleration of the telescope 125. The drive 160 applies a torque $T_3$ to accelerate the telescope 125. An equal and opposite reaction torque $T_4$ acts on the alidade 115 as the telescope 125 is accelerated, causing the alidade 115 to rotate in the opposite direction by an angle $\alpha_2$ as indicated at 565. Angle sensor 165 measures a total angle $\alpha_1$ which is the sum of angles $\alpha_2$ and $\alpha_3$, as represented at 570, and supplies an elevation measurement signal $\alpha_{3meas}$. The elevation measurement signal $\alpha_{3meas}$ thus includes an error in the amount of angle $\alpha_2$, while the angle which should be measured is $\alpha_1$ without the influence of error angle $\alpha_2$.

The above-mentioned problems relating to torsional reaction, particularly during high angular acceleration, are alleviated by instruments and methods as set forth in the appended claims.

Hence, the present invention is based upon the idea of having both a first and a second angle sensor in the instrument, e.g. the total station, for measuring rotation about a particular axis, wherein the first angle sensor is an angle resolver and the second angle sensor is an inertial sensor. By combining the measurement signals from the two angle sensors, a compensated angle measurement signal is obtained accounting for torsional reaction. Rapid and accurate measurement of angular position relative to an external reference may thus be obtained and improved control loops may be implemented.

Typically, according to the present invention, an angle resolver has the purpose of measuring the angular position of the alidade relative to the base of the total station, or the angular position of the telescope relative to the alidade. The angle resolver thus provides an accurate measurement of the relative angle position within the instrument. In addition, the inertial sensor typically has the purpose of measuring the relative angular position between components of the instrument and corresponding external references.

Using only angle resolvers would not take into account any angular displacement of other components in the total station due to torsional reaction, particularly at high angular accelerations. On the other hand, using only inertial sensors for determining angular position would lead to poor accuracy and long-term instability.

The present invention provides an improved instrument, in which the benefits of angle resolvers and inertial sensors are combined, to give a greatly improved accuracy and controllability in terms of angular position, particularly during high angular acceleration of components within the instrument.

A particularly preferred embodiment of the present invention is a geodetic instrument, such as a total station, in which combined angular resolvers and inertial sensors are utilized for determining the true azimuthal and elevational angular position of the telescope with respect to external references. Azimuthal angular position is determined with high accuracy relative to an external azimuthal reference, such as magnetic north. Elevational angular position is determined with high accuracy relative to an external elevational reference, such as a vertical axis. Any skew of ideally stationary parts, such as tripods, instrument mounting equipment, etc., due to torsional reaction, which in the prior art deteriorated the measurement, will be taken into account in a total station according to the invention by providing compensated angle measurement signals. The compensated angle measurement signals are fed to a respective drive to control the elevational and azimuthal angular position of the telescope according to reference signals indicating the desired line of sight.

By implementing the inventive methods and instruments described herein, improved control loops and use of high angular accelerations are facilitated. In effect, repositioning to a new line of sight (e.g. in a total station) may be achieved much faster and in a more stable fashion than what has been possible in prior art technologies. Hence, apart from improving accuracy, implementations of the inventive ideas disclosed herein facilitates stabilization of control loops, such that faster control may be obtained.

Further aspects, features and advantages of the present invention will be appreciated when the following detailed description is read and understood.

BRIEF DESCRIPTION OF THE DRAWINGS

In the introduction above and in the detailed description presented below, reference is made to the accompanying drawings, on which:

FIG. 1 shows a simplified elevation view of a prior-art total station;

FIG. 2a shows a top view of the total station of FIG. 1;

FIG. 2b shows a top view of the total station of FIG. 1 illustrating an error introduced as the alidade is accelerated;

FIG. 3a schematically illustrates an idealized control loop for azimuthal rotation of the alidade of the total station of FIG. 1;

FIG. 3b schematically illustrates a more realistic control loop which takes into account the error introduced during acceleration of the alidade of the total station of FIG. 1;

FIG. 4a shows a schematic side view of the total station of FIG. 1;

FIG. 4b shows a partially-cutaway view of the total station of FIG. 1 illustrating schematically an error introduced as the telescope is accelerated;

FIG. 5a schematically illustrates an idealized control loop for elevational rotation of the telescope of the total station of FIG. 1;

FIG. 5b schematically illustrates a more realistic control loop which takes into account the error introduced during acceleration of the telescope of the total station of FIG. 1;

FIG. 6 shows a simplified elevation view of an embodiment of a total station in accordance with the invention;

FIG. 7 schematically shows an alidade-control loop of the embodiment of FIG. 6;

FIG. 8a shows the transfer functions of the filters of FIG. 7;

FIG. 8b shows the transfer function of the combined filters of FIG. 7;

FIG. 9 shows a simplified elevation view of an embodiment of a total station in accordance with the invention;

FIG. 10 shows an alidade-control loop of the embodiment of FIG. 9;

FIG. 11 shows the transfer function of the filter of FIG. 10;

FIG. 12 shows a simplified elevation view of an embodiment of a total station in accordance with the invention;

FIG. 13 schematically shows a telescope-control loop of the embodiment of FIG. 12;

FIG. 14a shows the transfer functions of the filters of FIG. 13;

FIG. 14b shows the transfer function of the combined filters of FIG. 13;

FIG. 15 shows a simplified elevation view of an embodiment of a total station in accordance with the invention;

FIG. 16 schematically shows a telescope-control loop of the embodiment of FIG. 15;

FIG. 17 shows the transfer function of the filter of FIG. 16;

FIG. 18 shows a simplified elevation view of an embodiment in accordance with the invention combining features of the embodiments of FIGS. 6 and 12;

FIG. 19 shows a simplified elevation view of an embodiment in accordance with the invention combining features of the embodiments of FIGS. 6 and 15;

FIG. 20 shows a simplified elevation view of an embodiment in accordance with the invention combining features of the embodiments of FIGS. 9 and 12;

FIG. 21 shows a simplified elevation view of an embodiment in accordance with the invention combining features of the embodiments of FIGS. 9 and 15;

FIG. 22 schematically shows a top view of a total station in accordance with an embodiment of the invention;

FIG. 23 schematically shows a top view of a total station in accordance with an embodiment of the invention;

FIG. 24 shows an example of signal processing circuit functions in accordance with an embodiment of the invention;

FIG. 25 shows an example of signal processing circuit functions in accordance with an embodiment of the invention;

FIG. 25 show an example of signal processing circuit functions in accordance with an embodiment of the invention;

FIG. 26 shows transfer characteristics of filters useful, for example, in the embodiment of FIG. 25;

FIG. 27 shows a partial sectional elevation view of a total station in accordance with an embodiment of the invention; and FIG. 28 is a functional block diagram of the total station of FIG. 27.

DETAILED DESCRIPTION

FIG. 6 shows a simplified elevation view of an embodiment of a total station 600 in accordance with the invention. The total station of FIG. 6 differs from the total station of FIG. 1 in that it includes a second angle sensor 645 and modified processing circuitry including, e.g., a processor 650, which provides for reduction of control error during acceleration of alidade 115.

In accordance with embodiments of the invention, second angle sensor 645 is an inertial sensor which may include without limitation a gyro, an accelerometer, or a group of accelerometers. Inertial sensors have the desirable characteristic that they measure the true angle of rotation of a component, such as the alidade, and are thus not susceptible to high-frequency error from torsional reaction of a second component, such as the base. In this respect, inertial sensors enjoy an advantage over angle encoders, magnetic angle resolvers, and capacitive angle resolvers typically employed in geodetic instruments such as total stations. However, inertial sensors have the undesirable characteristic that they are susceptible to low-frequency noise, such as from thermal and electronic inherent noise in the sensor and sensor electronics, prominent in the low-frequency regions. In contrast, angle encoders, magnetic angle resolvers, and capacitive angle resolvers typically employed in geodetic instruments such as total stations have the desirable characteristic that they are not susceptible to such low-frequency noise.

FIG. 7 schematically shows an alidade-control loop of the embodiment of FIG. 6 which compensates for the counter-rotation of base 105 as alidade 115 is angularly accelerated. Drive 140 applies a torque $T_1$ to accelerate alidade 115. An equal and opposite reaction torque $T_2$ acts on base 105 as alidade 115 is accelerated, causing base 105 to rotate in the opposite direction by an angle $\phi_2$ as indicated at 365. Angle sensor 145 measures a total angle $\phi_1$ which is the sum of angles $\phi_2$ and $\phi_3$, as represented at 370, and supplies a first azimuth measurement signal 705. Angle sensor 145 is, for example, an angle encoder, magnetic angle resolver, or capacitive angle resolver. First azimuth measurement signal 705 is passed through a low-pass filter 710 to produce a filtered first azimuth measurement signal 715.

A second angle sensor 645 with inherent low-frequency noise supplies a second azimuth measurement signal 725 which is the sum (as indicated at 720) of angle $\phi_3$ and possible low-frequency noise N1. Angle sensor 645 is, for example, an inertial sensor. Second azimuth measurement signal 725 is passed through a high-pass filter 730 to produce a filtered second azimuth measurement signal 735. Filtered first azimuth measurement signal 715 and filtered second azimuth measurement signal 735 are combined as represented at 740 to produce a compensated azimuth measurement 745. Compensated azimuth measurement 745 (a calculated value for angle $\phi_3$ identified as $\phi_{3calc}$) is combined as shown schematically at 315 with an azimuth reference signal $R_A$ from a source 310. The resulting difference signal $D_A$ is supplied to regulator 320 which controls drive 140. Drive 140 rotates alidade 115 as indicated at 330 until difference signal $D_A$ is zero.

A characteristic of the first azimuth measurement signal is that it is largely free of low-frequency noise, such as that due to thermal and electronic noise inherent in the sensor and sensor electronics. Its high-frequency error, due to rotational acceleration of alidade 115, is removed by low-pass filter 710 in producing filtered first azimuth measurement signal 715. A characteristic of the second azimuth measurement signal is that it is largely free of high-frequency noise, such as that due to torsional reaction of base 105 to rotational acceleration of alidade 115. Its low-frequency noise, such as that due to thermal and electronic noise inherent in the sensor and sensor electronics, is removed by high-pass filter 730 in producing filtered second azimuth measurement signal 735.

FIG. 8a shows the transfer function (expressed as a gain vs. frequency characteristic) of low-pass filter 710 at 800 and of high-pass filter 730 at 805. In accordance with embodiments of the invention, filter 710 and filter 735 are each designed having a transfer function Y, expressed in the z-transform as:

$$Y = \frac{B0 + B1 \cdot z^{-1} + B2 \cdot z^{-2} + B3 \cdot z^{-3}}{1 + A1 \cdot z^{-1} + A2 \cdot z^{-2} + A3 \cdot z^{-3}} \cdot U$$

where U is the input signal (e.g., the input signal U is the first azimuth measurement signal 705 in the case of filter 710 and is the second azimuth measurement signal 725 in the case of filter 730) and Y is the output signal (e.g., output signal Y is the filtered first azimuth measurement signal 715 in the case of filter 710 and is the filtered second azimuth measurement signal 735 in the case of filter 730). Filter coefficients B0, B1, B2, B3, A1, A2 and A3 have different values for low-pass filter 710 and high-pass filter 730, respectively.

FIG. 8b shows the transfer function 810 (expressed as a gain vs. frequency characteristic) of the combined filters 710 and 730. Filters 710 and 730 are preferably designed such that transfer function 810 is constant over frequency. For example, once filter coefficients have been chosen for a suitable low-pass filter 710, then coefficients are chosen for high-pass filter 730 such that the combined transfer function 810 is constant over frequency. Cut-off frequency range for both filters is, for example 5-30 Hz.

FIG. 9 shows a simplified elevation view of an embodiment of a total station 900 in accordance with the invention. The total station of FIG. 9 differs from the total station of FIG. 6 in that it includes a second angle sensor 945 in base 105 (rather than in alidade 115) and modified processing circuitry including, e.g., a processor 950, which provides for reduction of control error during acceleration of alidade 115.

FIG. 10 schematically shows an alidade-control loop of the embodiment of FIG. 9 which compensates for the counter-rotation of base 105 as alidade 115 is angularly accelerated. Drive 140 applies a torque $T_1$ to accelerate alidade 115. An equal and opposite reaction torque $T_2$ acts on base 105 as alidade 115 is accelerated, causing base 105 to rotate in the opposite direction by an angle $\phi_2$ as indicated at 365. Angle sensor 145 measures a total angle $\phi_1$ which is the sum of angles $\phi_2$ and $\phi_3$, as represented at 370, and supplies a first azimuth measurement signal 1005. Angle sensor 145 is, for example, an angle encoder, a magnetic angle resolver, or a capacitive angle resolver. In contrast to the embodiment of FIGS. 6-7, the first azimuth measurement signal 1005 is not low-pass filtered.

A second angle sensor 945 with inherent low-frequency noise supplies a second azimuth measurement signal 1015 which is the sum (as indicated at 1010) of angle $\phi_2$ and possible low-frequency noise N1. That is, because angle sensor 945 is mounted on base 105, its output is a direct measurement of the angle of rotation $\phi_2$ of base 105, plus any applicable low-frequency noise N1. Angle sensor 945 is, for example, an inertial sensor. Second azimuth measurement signal 1015 is passed through a high-pass filter 1020 to produce a filtered second azimuth measurement signal 1025. First azimuth measurement signal 1005 and filtered second azimuth measurement signal 1025 are combined as represented at 1030 to produce a compensated azimuth measurement signal 1035. In this embodiment, the signals are combined by subtracting the filtered second azimuth measurement signal 1025 from the first azimuth measurement signal 1005. Compensated azimuth measurement 1035 (a calculated value for angle $\phi_3$ identified as $\phi_{3calc}$) is combined as shown schematically at 315 with an azimuth reference signal $R_A$ from a source 310. The resulting difference signal $D_A$ is supplied to regulator 320 which controls drive 140. Drive 140 rotates alidade 115 as indicated at 330 until difference signal $D_A$ is zero.

A characteristic of the first azimuth measurement signal is that it is largely free of low-frequency noise, such as that due to thermal and electronic noise inherent in the sensor and sensor electronics. Its high-frequency error, due to rotational acceleration of alidade 115, is removed in this embodiment by subtracting the error as measured by angle sensor 945.

A characteristic of the second azimuth measurement signal in this embodiment is that it is largely free of high-frequency noise, such as that due to rotational reaction of base 105 to acceleration of alidade 115. Its low-frequency noise, such as that due to thermal and electronic noise inherent in the sensor and sensor electronics, is removed by high-pass filter 1020 in producing filtered second azimuth measurement signal 1025.

FIG. 11 shows the transfer function (expressed as a gain vs. frequency characteristic) of high-pass filter 1020 at 1105. In accordance with embodiments of the invention, filter 1020 is designed having a transfer function Y, expressed in the z-transform as:

$$Y = \frac{B0 + B1 \cdot z^{-1} + B2 \cdot z^{-2} + B3 \cdot z^{-3}}{1 + A1 \cdot z^{-1} + A2 \cdot z^{-2} + A3 \cdot z^{-3}} \cdot U$$

where U is the input signal (e.g., the input signal U is the second azimuth measurement signal 1015) and Y is the output signal (e.g., output signal Y is the filtered second azimuth measurement signal 1025 in the case of filter 1020). Cut-off frequency range for the filter is, for example 5-30 Hz (preferably in the higher end), and the gain should be 1 in the flat regime of the transfer function.

FIG. 12 shows a simplified elevation view of an embodiment of a total station 1200 in accordance with the invention. The total station of FIG. 12 differs from the total station of FIG. 1 in that it includes a second angle sensor 1245 and modified processing circuitry including, e.g., a processor 1250, which provides for reduction of control error during rotational acceleration of telescope 125. In accordance with embodiments of the invention, second angle sensor 1245 is an inertial sensor which may include without limitation a gyro, an accelerometer, or a group of accelerometers.

FIG. 13 schematically shows a telescope-control loop of the embodiment of FIG. 12 which compensates for the counter-rotation of alidade 115 as telescope 125 is angularly accelerated. Drive 160 applies a torque $T_3$ to accelerate telescope 125. An equal and opposite reaction torque $T_4$ acts on alidade 115 as telescope 125 is accelerated, causing alidade 115 to rotate in the opposite direction by an angle $\alpha_2$ as indicated at 565. Angle sensor 165 measures a total angle $\alpha_1$ which is the sum of angles $\alpha_2$ and $\alpha_3$, as represented at 570, and supplies a first elevation measurement signal 1305. Angle sensor 165 is, for example, an angle encoder, magnetic angle resolver, or capacitive angle resolver. First elevation measurement signal 1305 is passed through a low-pass filter 1310 to produce a filtered first elevation measurement signal 1315.

A second angle sensor 1245 with inherent low-frequency noise supplies a second elevation measurement signal 1325 which is the sum (as indicated at 1320) of angle $\alpha 3$ and possible low-frequency noise N2. Angle sensor 1245 is, for example, an inertial sensor. Second elevation measurement signal 1325 is passed through a high-pass filter 1330 to produce a filtered second elevation measurement signal 1335. Filtered first elevation measurement signal 1315 and filtered second elevation measurement signal 1335 are combined as represented at 1340 to produce a compensated elevation measurement 1345. Compensated elevation measurement 1345 (a calculated value for angle $\alpha_3$ identified as $\alpha_{3calc}$) is combined as shown schematically at 515 with an elevation reference signal $R_E$ from a source 510. The resulting difference signal $D_E$ is supplied to regulator 520 which controls drive 160. Drive 160 rotates telescope 135 as indicated at 530 until difference signal $D_E$ is zero.

A characteristic of the first elevation measurement signal is that it is largely free of low-frequency noise, such as that due to thermal and electronic noise in the sensor and sensor electronics. Its high-frequency error, due to rotational acceleration of telescope 125, is removed by low-pass filter 1310 in producing filtered first elevation measurement signal 1315. A characteristic of the second elevation measurement signal is that it is largely free of high-frequency noise, such as that due to torsional reaction of alidade 115 to rotational acceleration of telescope 125. Its low-frequency noise, such as that due to thermal and electronic noise inherent in the sensor and sensor electronics, is removed by high-pass filter 1330 in producing filtered second elevation measurement signal 1335.

FIG. 14a shows the transfer function (expressed as a gain vs. frequency characteristic) of low-pass filter 1310 at 1400 and of high-pass filter 1330 at 1405. In accordance with embodiments of the invention, filter 1310 and filter 1330 are each designed having a transfer function Y, expressed in the z-transform as:

$$Y = \frac{B0 + B1 \cdot z^{-1} + B2 \cdot z^{-2} + B3 \cdot z^{-3}}{1 + A1 \cdot z^{-1} + A2 \cdot z^{-2} + A3 \cdot z^{-3}} \cdot U$$

where U is the input signal (e.g., the input signal U is the first elevation measurement signal 1305 in the case of filter 1310 and is the second elevation measurement signal 1325 in the case of filter 1330) and Y is the output signal (e.g., output signal Y is the filtered first elevation measurement signal 1315 in the case of filter 1310 and is the filtered second elevation measurement signal 1335 in the case of filter 1330). Filter coefficients B0, B1, B2, B3, A1, A2 and A3 have different values for low-pass filter 1310 and high-pass filter 1330, respectively.

FIG. 14b shows the transfer function 1410 (expressed as a gain vs. frequency characteristic) of the combined filters 1310 and 1330. Filters 1310 and 1330 are designed such that transfer function 1410 is substantially constant over frequency. For example, once filter coefficients have been chosen for a suitable low-pass filter 1310, then coefficients are chosen for high-pass filter 1330 such that the combined transfer function 1410 is constant over frequency. Cut-off frequency range for both filters is, for example 5-30 Hz.

FIG. 15 shows a simplified elevation view of an embodiment of a total station 1500 in accordance with the invention. The total station of FIG. 15 differs from the total station of FIG. 12 in that it includes a second angle sensor 1545 in alidade 115 (rather than in telescope 125) and modified processing circuitry including, e.g., a processor 1550, which provides for reduction of control error during acceleration of telescope 125.

FIG. 16 schematically shows a telescope-control loop of the embodiment of FIG. 15 which compensates for the counter-rotation of alidade 115 as telescope 125 is angularly accelerated. Drive 160 applies a torque $T_3$ to accelerate telescope 125. An equal and opposite reaction torque $T_4$ acts on alidade 125 as telescope 125 is accelerated, causing alidade 115 to rotate in the opposite direction by an angle $\alpha_2$ as indicated at 565. Angle sensor 165 measures a total angle $\alpha_1$ which is the sum of angles $\alpha_2$ and $\alpha_3$, as represented at 570, and supplies a first elevation measurement signal 1605. Angle sensor 165 is, for example, an angle encoder, a magnetic angle resolver, or a capacitive angle resolver. In contrast to the embodiment of FIGS. 12-13, the first elevation measurement signal 1605 is not low-pass filtered.

A second angle sensor 1545 with inherent low-frequency noise supplies a second elevation measurement signal 1625 which is the sum (as indicated at 1620) of angle $\alpha_2$ and possible low-frequency noise N2. That is, because angle sensor 1545 is mounted on alidade 115, its output is a direct measurement of the angle of rotation $\alpha_2$ of alidade 115, plus any applicable low-frequency noise N2. Angle sensor 1545 is, for example, an inertial sensor. Second elevation measurement signal 1625 is passed through a high-pass filter 1630 to produce a filtered second elevation measurement signal 1635. First elevation measurement signal 1605 and filtered second elevation measurement signal 1635 are combined as represented at 1640 to produce a compensated elevation measurement 1645. In this embodiment, the signals are combined by subtracting the filtered second elevation measurement signal 1635 from the first elevation measurement signal 1605. Compensated elevation measurement 1645 (a calculated value for angle $\alpha_3$ identified as $\alpha_{3calc}$) is combined as shown schematically at 515 with an elevation reference signal $R_E$ from a source 510. The resulting difference signal $D_E$ is supplied to regulator 520 which controls drive 160. Drive 160 rotates telescope 125 as indicated at 530 until difference signal $D_E$ is zero.

A characteristic of the first elevation measurement signal 1605 is that it is largely free of low-frequency noise, such as that due to thermal and electronic noise inherent in the sensor and sensor electronics. Its high-frequency error, due to rotational acceleration of telescope 125, is removed in this embodiment by subtracting the error as measured by angle sensor 1545.

A characteristic of the second elevation measurement signal in this embodiment is that it is largely composed of high-frequency noise, such as that due to rotational reaction of alidade 115 to acceleration of telescope 125. Its low-frequency noise, such as that due to thermal and electronic noise inherent in the sensor and sensor electronics, is removed by high-pass filter 1630 in producing filtered second elevation measurement signal 1635.

FIG. 17 shows the transfer function (expressed as a gain vs. frequency characteristic) of high-pass filter 1630 at 1705. In accordance with embodiments of the invention, filter 1630 is designed having a transfer function Y, expressed in the z-transform as:

$$Y = \frac{B0 + B1 \cdot z^{-1} + B2 \cdot z^{-2} + B3 \cdot z^{-3}}{1 + A1 \cdot z^{-1} + A2 \cdot z^{-2} + A3 \cdot z^{-3}} \cdot U$$

where U is the input signal (e.g., the input signal U is the second elevation measurement signal 1625) and Y is the output signal (e.g., output signal Y is the filtered second elevation measurement signal 1635 in the case of filter 1630). Cut-off frequency range for the filter is, for example 5-30 Hz (preferably in the higher end), and the gain should preferably be 1 or close thereto in the flat regime of the transfer function.

As will be appreciated, the frequency filters may be implemented as adaptive filters.

As an alternative of using high and low pass filters for combining the output from the inertial sensor and the angle sensor, a Kalman filter may be used. With a known signal to noise ratio for the sensor, a Kalman filter will produce an optimal solution for the sensor output fusion. A Kalman filter may be used instead of the frequency filters and the combiner for the filter outputs, thus providing an output from the Kalman filter which is combined with the reference signal and fed to the regulator. Alternatively, a Kalman filter may have a further input for receiving also the reference signal, thus producing an output for feeding directly to the alidade drive. A person of ordinary skills in the relevant art and having the benefit of the present specification, will know how to make an implementation of the inventive ideas presented herein based on the use of Kalman filters.

FIG. 18 shows a simplified elevation view of an embodiment in accordance with the invention combining a second azimuth angle sensor 645 as in the embodiment of FIG. 6 and a second elevation angle sensor 1245 as in the embodiment of FIG. 12. Processing circuitry with processor 1850 includes the functions described with reference to FIGS. 6-8 for producing a compensated azimuth measurement 745 used in control of drive 140 as well as the functions described with reference to FIGS. 12-14 for producing a compensated elevation measurement 1345 used in control of drive 160.

FIG. 19 shows a simplified elevation view of an embodiment in accordance with the invention combining features of the embodiments of FIGS. 6 and 15. Processing circuitry with processor 1950 includes the functions described with reference to FIGS. 6-8 for producing a compensated azimuth measurement 745 used in control of drive 140 as well as the functions described with reference to FIGS. 15-17 for producing a compensated elevation measurement 1645 used in control of drive 160.

FIG. 20 shows a simplified elevation view of an embodiment in accordance with the invention combining features of the embodiments of FIGS. 9 and 12. Processing circuitry with processor 2050 includes the functions described with reference to FIGS. 9-11 for producing a compensated azimuth measurement 1035 used in control of drive 140 as well as the functions described with reference to FIGS. 12-14 for producing a compensated elevation measurement 1345 used in control of drive 160.

FIG. 21 shows a simplified elevation view of an embodiment in accordance with the invention combining features of the embodiments of FIGS. 9 and 15. Processing circuitry with processor 2150 includes the functions described with reference to FIGS. 9-11 for producing a compensated azimuth measurement 1035 used in control of drive 140 as well as the functions described with reference to FIGS. 15-17 for producing a compensated elevation measurement 1645 used in control of drive 160.

In accordance with embodiments of the invention, the second angle sensor (angle sensor 645, 945, 1245, 1545, respectively) is an inertial sensor. An inertial sensor may comprise without limitation a gyro, one or more accelerometers, or even a laser gyro. The type of inertial sensor selected may depend on such factors as size, weight, cost, and performance. Suitable for use in a total station are, for example, the "Series 660" embeddable accelerometers commercially available from IMI Sensors of Depew, N.Y., USA.

A single accelerometer can be used, if desired, but will be subject to error due to linear displacements transverse to the axis of rotation. FIG. 22 schematically shows a top view of a total station 2200 in which alidade 115 is provided with a second azimuth angle sensor 2245 comprising a single accelerometer 2250 in accordance with an embodiment of the invention. The accelerometer signal is proportional to the product of rotational acceleration and the distance to the axis of rotation; if the accelerometer were placed exactly at the axis of rotation, no signal would be obtained. If a lateral displacement of axis of rotation 120 occurs during rotation of alidade 115, accelerometer 2250 will be subject not only to force 2260 due to rotation of alidade 115 but also to a component of force 2265 caused by lateral displacement of axis 120 and thus representing noise in the signal from accelerometer 2250. Since accelerometers are responsive to acceleration, mathematically the first time derivative of velocity and the second time derivative of displacement, the signal from accelerometer is integrated a first time as indicated schematically at 2280 to obtain angular velocity and is integrated a second time as indicated at 2285 to obtain angular displacement.

FIG. 23 schematically shows a top view of a total station 2300 in which alidade 115 is provided with a second azimuth angle sensor 2345 comprising a pair of accelerometers 2350 and 2355 in accordance with an embodiment of the invention. If a lateral displacement of axis of rotation 120 occurs during rotation of alidade 115, accelerometer 2350 will be subject to force 2360 due to rotation of alidade 115 and also to a component of force 2365 caused by lateral displacement of axis 120 and thus representing noise in the signal from accelerometer 2350. Accelerometer 2355 will at the same time be subject to a force due to rotation of alidade 115 and also to a component of force caused by lateral displacement of axis 120 and thus representing noise in the signal from accelerometer 2355. If accelerometers 2350 and 2355 are placed on opposite sides of the axis of rotation as shown, adding their signals will cause the lateral-displacement (noise) components of their signals to cancel as they are of opposite phase and the angular-displacement (desired information) component of their signals to be summed as they are in phase with one another. After combining the signals from accelerometers 2350 and 2355 as shown schematically at 2380, the combined signal is integrated a first time as indicated at 2385 to obtain angular velocity and is integrated a second time as indicated at 2390 to obtain angular displacement.

Signal processing schemes are described schematically to illustrate the functional characteristics of the processing. These functional characteristics can be achieved using a variety of known techniques. For example, signal processing can be carried out using entirely analog signal-processing components. For example, signal processing can be carried out by converting signals as desired from analog to digital form and using digital signal-processing components. Digital signal processing components can be special-purpose component and/or one or more programmed general-purpose processors or microcontroller, or a mix of any of these. A total station typically has a main processor which is programmed to carry out various functions and which in accordance with embodiments of the invention is programmed to carry out some or all of the described signal processing functions.

FIG. 24 shows a further example of signal processing circuit functions 2400 in accordance with an embodiment of the invention. In this example, the high-pass filtering function is performed in two parts. An optical angle encoder 2405 (serving for example as azimuth angle sensor 145 or elevation angle sensor 165) provides a digital first angular position signal to a digital low-pass filter 2410. A gyro 2445 provides an analog second angular position signal which is passed through an analog high-pass filter 2450 before being passed through an amplifier 2455 and supplied to an analog-to-digital converter 2460. The resulting second digital angular position signal is passed through a digital high-pass filter 2465. The filtered first angular position signal from digital low-pass filter 2410 is combined with the filtered second angular position signal from digital high-pass filter 2465 in a summing function 2470 to produce a compensated angular position measurement 2475 which is used in controlling, for example, azimuth drive 140 or elevation drive 160. Each of digital low-pass filter 2410, digital high-pass filter 2465 and summing function 2470 is implemented, for example, as program instructions carried out in a general-purpose processor or microcontroller and/or other suitable device.

FIG. 25 shows a further example of signal processing circuit functions 2500 in accordance with an embodiment of the invention. In this example, the high-pass filtering function is performed in two parts. An optical angle encoder 2505 (serving for example as azimuth angle sensor 145 or elevation angle sensor 165) provides a digital first angular position signal to a digital low-pass filter 2510. Analog signals from a pair of accelerometers 2515, 2520 are combined in an analog summing function 2525 and the resulting combined accelerometer signal is passed through an analog first-order high-pass filter 2530 before being passed through an amplifier 2535 and supplied to an analog-to-digital converter 2540. The digital signal from a/d converter 2540 is then passed through a digital third-order high-pass filter 2545 and double-integrated in a process 2550 to produce a filtered second angular position signal. The filtered first angular position signal and the filtered second angular position signal are combined in a digital summing function 2555 to produce a compensated angular position measurement 2560 which is used in controlling, for example, azimuth drive 140 or elevation drive 160. Each of digital low-pass filter 2510, digital high-pass filter 2545, double-integration function 2550 and summing function 2555 is implemented, for example, as program instructions carried out in a general-purpose processor or microcontroller and/or other suitable device.

FIG. 26 shows transfer characteristics of filters useful, for example, in the embodiment of FIG. 24. Curve 2610 represents the characteristic of digital low-pass filter 2410. Curve 2635 represents the characteristic of analog high-pass filter 2450. Curve 2680 represents the characteristic digital high-pass filter 2465.

Embodiments in accordance with the invention include geodetic instruments incorporating one or more inertial sensors as described. For example, FIG. 27 schematically shows a partial sectional elevation view of a total station in accordance with an embodiment of the invention and FIG. 28 is a functional block diagram of such a total station.

Referring to FIG. 27, total station 2700 has an alidade 2702 mounted on an adjustable tribrach 2704 for rotation about a support axis 2706 which is vertical when alidade 2702 is level. A telescope unit 2708 having a telescope 2710 with an optical centerline (line of sight) 2712 is mounted for rotation about an elevation axis 2714 orthogonal to support axis 2706.

A controllable horizontal drive 2716 rotates alidade 2702 about support axis 2706 in response to control signals. Markings of a graduated ring 2718 fixed with respect to tribrach 2704 are detected by a horizontal angle sensor 2720 as alidade 2702 is rotated. An inertial sensor 2780 detects azimuthal orientation of alidade 2702; inertial sensor 2780 is shown mounted in alidade 2702 but may be mounted in base 2704 as discussed above. A controllable vertical drive 2722 rotates telescope unit 2708 about elevation axis 2714 in response to control signals. Markings of a graduated ring 2724 fixed with respect to telescope unit 2708 are detected by a vertical angle sensor 2726 as telescope unit 2708 is rotated. An inertial sensor 2790 detects elevation orientation of telescope unit 2708; inertial sensor 2790 is shown mounted in alidade 2702 but may be mounted in telescope unit 2708 as discussed above. A horizontal control 2728 with manually-operable knob and a vertical control 2730 with manually-operable knob provide user inputs for control of horizontal drive 2716 and vertical drive 2722, respectively.

Alidade 2702 is rotatable about support axis 2706 to any desired angle and telescope unit 2720 is rotatable about elevation axis 2714 to any desired angle, even angles exceeding 360 degrees, for aiming of telescope 2710 at an arbitrarily-positioned external target. Slip rings 2732 provide for transmission of power from an external power supply (shown in FIG. 28) to alidade 2702 and/or communication of data and commands between alidade 2702 and an external control unit (shown in FIG. 28). Slip rings 2734 provide for transmission of power from alidade 2702 to telescope unit 2708 and communication of data and commands between alidade 2702 and telescope unit 2708.

Alidade 2702 includes a handle 2736 for easy transport. An optical plummet 2738 is provided to facilitate manual positioning of total station 2700 over a survey monument or other selected point by emitting a light beam vertically downward which is coaxial with support axis 2706. An inclination detector 2740, such as described with reference to FIGS. 1-8, supplies a signal representing inclination of alidade 2702 in two mutually-orthogonal directions and thus enables setting up the total station so that support axis 2706 is plumb and elevation axis is horizontal.

A radio module 2742 with antenna 2744 provides for communication of data and commands between total station 2700 and an external radio control unit (shown in FIG. 28). A battery 2746 is provided to supply electrical power for total station 2700. Total station 2700 also has a removable control unit with a keypad and/or other input devices and a display screen (shown in FIG. 28).

Referring to the block diagram 2800 of FIG. 28, dashed lines indicate physical units in which the respective elements are arranged. Within alidade 2702 is a power supply 2802 connected to battery 2746 for powering a main processor 2804 and other elements of the total station. Main processor 2804 includes associated memory, program storage and the like, not shown. Power supply connections are not shown so as not to obscure the functional relationships of components. Power is provided via individual connections from power supply 2802 to components of the total station and/or via a bus such as a universal serial bus (USB) which combines power distribution and data communication. Similarly, communication between main processor 2804 and other components of the total station is via individual connections and/or via a common bus such a universal serial buses. Slip rings 2732 provide electrical connection to an external unit 2808 having a power supply 2810 and/or an external control unit 2812. Slip rings 2734 provide for data communication between main processor 2804 and components of telescope unit 2708 and for supply of power to components of telescope unit 2708. Each of the functional elements is under control of main processor 2804 and can be commanded to transmit measurement results to main processor 2804.

Horizontal control 2728, vertical control 2730 and a focus control 2814 provide for manual input of commands to set azimuthally orientation of alidade 2702, elevation telescope unit 2708 and optical focus of telescope 2710. The commands are communicated via an interface 2816 to main processor 2804. A removable console 2818 provides a display screen 2820 and input devices 2822 such as a keypad and/or touch screen. Console 2818 serves for communication between a human operator and the total station, enabling manual input of commands and data and display of user menus and data. Console 2818 includes an input/output processor 2824 for managing communication with main processor 2804 and supporting other tasks such as geodetic computations. Console 2818 is connected with main processor 2804 and power supply 2802 by a connector 2826.

Radio module 2742 communicates via the bus with main processor 2804 and via antenna 2744 with a radio control unit 1026 having an antenna 2828. The total station can be remotely controlled from radio control unit 1026, for example when located at the measurement target.

Telescope unit 2708 includes a distance-measurement module 2830, a servo-focus module 2832, a tracker module 2834 and a tracking assistant module 2836.

Distance-measurement module 2830 measures distance from the total station to a target, for example by emitting light toward the target and detecting phase change of the reflected light or by emitting light pulses toward the target and determining time of flight of reflected pulses. Distance-measurement computation is performed in circuitry of distance measurement module 2830 and/or in main processor 2804

Servo-focus module 2832 provides for controllable focus of the telescope optics, in dependence on signals from main processor 2804 in response to manual adjustment of focus control 2814 and/or in response to auto-focus circuitry within servo-focus module 2832.

Tracker module 2834 enables the total station to automatically aim the telescope at and follow a target as the target is moved. Tracker module 2834 emits a narrow beam of light through the telescope optics. This light, when reflected from a target, is detected by a sensor which sends a tracking signal to main processor 2804 to indicate needed changes of azimuth and elevation.

Tracking assistant module 2836 assists a human operator to place a movable target in the optical axis of the telescope, by emitting lights which are directed so that the human operator sees respective different colors when positioned on one side or the other of the telescope's line of sight.

Azimuthal orientation of alidade 2702 is known to main processor 2804 from signals received from horizontal angle sensor 2720. Azimuthal orientation of alidade 2702 is commanded by signals sent from main processor 2804 to horizontal drive controller 2840. Horizontal drive 2716 is responsive to horizontal drive controller 2840 for rotating alidade 2702 about support axis 2706. Elevation of telescope unit 2708 is known to main processor 2804 from signals received from vertical angle sensor 2726. Elevation of telescope unit 2708 is commanded by signals sent from main processor 2804 to vertical drive controller 2842. Vertical drive 2722 is responsive to vertical drive controller 2842 for rotating telescope unit 2708 about elevation axis 2714.

Main processor 2804 determines the desired azimuth and elevation from one of several sources: manual setting of controls 2728 and 2730; manual entry of data via input devices 2822; remote commands from radio control unit 1026; and automatic signals from tracker 2834 when the tracking function is enabled.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

While embodiments and applications in accordance with the invention have been shown and described, it will be apparent to those skilled in the art having the benefit of this disclosure that many more modifications than mentioned above are possible without departing from the inventive concepts herein. The invention, therefore, is not to be restricted except in the spirit of the appended claims.

CONCLUSION

There is disclosed methods and apparatus for compensated measurement of angular displacement within an instrument, such as a total station. Improved and compensated measurement of angular displacement is obtained by using a combination of an angular resolver and an inertial sensor. A compensated angular position measurement is produced by combining at least portions of the output signals obtained from the angular resolver and the inertial sensor, respectively.

The invention claimed is:

1. An instrument comprising:
   a) a first component,
   b) a second component supported by the first component for rotation relative to the first component about a first axis,
   c) a first drive for rotating the second component about the first axis, d) a first angle sensor to produce a first angular position signal representing angular position ($\phi i$, $\alpha i$) of the second component about the first axis relative to a first reference, e) a second angle sensor to produce a second angular position signal representing one of (A) angular displacement ($\phi_2$, $\alpha_3$) of the first reference relative to a second reference, and (B) angular position ($\phi_3$, $\alpha_3$) of the second component about the first axis relative to the second reference, and f) a signal processor to produce a first compensated angular position measurement for the second component relative to the second reference by combining at least portions of the first angular position signal and the second angular position signal.

2. The instrument of claim 1, further comprising:

a) a third component supported by the second component for rotation relative to the second component about a second axis, b) a second drive for rotating the third component about the second axis, c) a third angle sensor to produce a third angular position signal representing angular position ($\alpha_2$) of the third component about the second axis relative to a third reference, and d) a fourth angle sensor (1245, 1545) to produce a fourth angular position signal representing one of (i) angular displacement ($\alpha_2$) of the third reference relative to a fourth reference, and (ii) angular position ($\alpha_3$) of the fourth component about the second axis relative to the fourth reference, wherein the signal processor further produces a second compensated angular position measurement for the third component relative to the fourth reference by combining at least portions of the third angular position signal and the fourth angular position signal.

3. The instrument of claim 1, wherein the instrument is a geodetic measurement instrument in which the first component is a base and the second component is an alidade.

4. The instrument of one of claim 1, wherein the instrument is a geodetic measurement instrument and the third component is a telescope.

5. The instrument of claim 1, wherein the instrument is a geodetic measurement instrument, the first component is an alidade and the second component is a telescope.

6. The instrument of claim 3, wherein the first reference is fixed with respect to the base.

7. The instrument of one of claim 3, wherein the second reference is external to the base.

8. The instrument of claim 1, wherein the first angle sensor comprises an angle resolver.

9. The instrument of claim 8, wherein the first angle sensor comprises one of an optical angle encoder, a magnetic angle resolver, and a capacitive angle resolver.

10. The instrument of claim 1, wherein the second angle sensor comprises an inertial sensor.

11. The instrument of claim 10, wherein the second angle sensor comprises one of an accelerometer, and a gyro.

12. The instrument of claim 1, wherein the first angular position signal has a higher accuracy in a lower-frequency band than in a higher-frequency band.

13. The instrument of claim 1, wherein the second angular position signal has a higher noise in a lower-frequency band than in a higher-frequency band.

14. The instrument of claim 1, wherein the first reference is angularly displaced ($\phi_2$, $\alpha_2$) due to reaction torque ($T_2$, $T_4$) acting on the first component with acceleration of the second component about the first axis, introducing a corresponding error in the first angular position signal.

15. The instrument of claim 1, wherein the second angle sensor is mounted on the first component and the second angular position signal represents angular displacement ($\phi_2$, $\alpha\Sigma$) of the first reference relative to a second reference.

16. The instrument of claim 1, wherein the second angle sensor is mounted on the second component and the second angular position signal represents angular position ($\phi_3$, $\alpha_3$) of the second component about the first axis relative to a second reference.

17. The instrument of claim 1, wherein the signal processor comprises a first frequency filter, a second frequency filter, and a combiner, and wherein the first angular position signal is passed through the first frequency filter to produce a filtered first angular position signal, the second angular position signal is passed through the second frequency filter to produce a filtered second angular position signal, and the combiner combines the filtered first angular position signal and the filtered second angular position signal to produce the first compensated angular position measurement signal.

18. The instrument of claim 1, wherein the signal processor comprises a frequency filter and a combiner, and wherein the second angular position signal is passed through the frequency filter to produce a filtered second angular position signal, and the combiner combines the first angular position signal and the filtered second angular position signal to produce the first compensated angular position measurement signal.

19. The instrument of claim 15, wherein the first frequency filter is a low-pass filter and the second frequency filter is a high pass filter.

20. The instrument of claim 15, wherein at least one of the first frequency filter and the second frequency filter comprises an analog filter element.

21. The instrument of claim 15, wherein at least one of the first frequency filter and the second frequency filter comprises a digital filter element.

22. The instrument of claim 18, wherein the digital filter element is implemented as program instructions in a general-purpose digital processor.

23. The instrument of claim 15, wherein the transfer function of the first frequency filter and the transfer function of the second frequency filter, when combined, is constant over frequency.

24. The instrument of claim 20, wherein the first frequency filter and the second frequency filter are adaptive filters.

25. A method of controlling an instrument having:

a first component, a second component supported by the first component for rotation relative to the first component about a first axis, and a first drive for rotating the second component about the first axis in response to a control signal ($D_A$, $D_E$), the method comprising:

i) obtaining from a first angle sensor a first angular position signal representing angular position ($\phi i$, $\alpha i$) of the second component about the first axis relative to a first reference, ii) obtaining from a second angle sensor a second angular position signal representing one of (i) angular displacement ($\phi_2$, $\alpha_2$) of the first reference relative to a second reference, and (ii) angular position ($\phi_3$, $\alpha_3$) of the second component about the first axis relative to a second reference, iii) combining at least portions of the first angular position signal and the second angular position signal to produce a first compensated angular position measurement, and iv) applying to the first drive a control signal derived from the first compensated angular position measurement.

26. The method of claim 25, wherein the instrument further comprises:

a third component supported by the second component for rotation relative to the second component about a second axis, a second drive for rotating the third component about the second axis, and wherein the method further comprises i) obtaining from a third angle sensor a third angular position signal representing angular position ($\alpha i$) of the third component about the second axis relative to a third reference, ii) obtaining from a fourth angle sensor a fourth angular position signal representing one of (A) angular displacement ($\alpha_2$) of the third reference relative to a fourth reference, and (B) angular position ($\alpha_3$) of the fourth component about the second axis relative to a fourth reference, iii) combining at least portions of the third angular position signal and the fourth angular position signal to produce a second compensated angular position measurement, and iv) applying to the second drive a control signal derived from the second compensated angular position measurement.

* * * * *

UNITED STATES PATENT AND TRADEMARK OFFICE
CERTIFICATE OF CORRECTION

PATENT NO. : 7,762,135 B2
APPLICATION NO. : 11/794308
DATED : July 27, 2010
INVENTOR(S) : Mikael Hertzman and Thomas Klang Page 1 of 1

It is certified that error appears in the above-identified patent and that said Letters Patent is hereby corrected as shown below:

Title Page
Please insert the priority data as shown:

--Related U.S. Application Data

(60)    Provisional application No. 60/643,521
        filed on January 12, 2005--

Col. 1, Line 4, insert:

--This application is a national phase under 35 USC § 371 of PCT Application No. PCT/EP2005/013164 filed on Dec. 8, 2005 which designated the United States of America, and which claims priority from U.S. Provisional Application No. 60/643,521, filed January 12, 2005.--

Signed and Sealed this
Thirteenth Day of September, 2011

David J. Kappos
*Director of the United States Patent and Trademark Office*